(12) United States Patent
Miura et al.

(10) Patent No.: US 9,052,763 B2
(45) Date of Patent: Jun. 9, 2015

(54) ELECTRONIC DEVICE HAVING A DISPLAY DISPLAYING A SYMBOL INDICATING EXECUTION OF A FUNCTION

(75) Inventors: Saya Miura, Yokohama (JP); Tsuneo Miyashita, Yokohama (JP); Yuka Ishizuka, Yokohama (JP); Tomohiro Sudoh, Yokohama (JP); Junichi Hasegawa, Machida (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 122 days.

(21) Appl. No.: 13/879,678

(22) PCT Filed: Oct. 18, 2011

(86) PCT No.: PCT/JP2011/073947
§ 371 (c)(1),
(2), (4) Date: Apr. 16, 2013

(87) PCT Pub. No.: WO2012/053516
PCT Pub. Date: Apr. 26, 2012

(65) Prior Publication Data
US 2013/0201144 A1 Aug. 8, 2013

(30) Foreign Application Priority Data
Oct. 18, 2010 (JP) .................. 2010-234085
Oct. 27, 2010 (JP) .................. 2010-241546

(51) Int. Cl.
*G06F 3/041* (2006.01)
*G06F 3/0488* (2013.01)
(Continued)

(52) U.S. Cl.
CPC ............ *G06F 3/041* (2013.01); *G06F 3/04883* (2013.01); *G06F 3/04886* (2013.01);
(Continued)

(58) Field of Classification Search
CPC . G06F 3/041; G06F 3/04817; G06F 3/04883; G06F 3/04886

USPC .................................................. 345/173, 1.1
See application file for complete search history.

(56) References Cited

U.S. PATENT DOCUMENTS

2003/0119562 A1   6/2003  Kokubo
2005/0083642 A1*  4/2005  Senpuku et al. .............. 361/681
(Continued)

FOREIGN PATENT DOCUMENTS

JP          2158875 A     6/1990
JP       2003-162355 A    6/2003
(Continued)

OTHER PUBLICATIONS

Office Action mailed May 27, 2014, corresponds to Japanese patent application No. 2010-234085, for which an explanation of relevance is attached.
(Continued)

*Primary Examiner* — Long D Pham
(74) *Attorney, Agent, or Firm* — Lowe Hauptman & Ham, LLP

(57) ABSTRACT

According to an aspect, an electronic device includes: a first housing having a first display unit; a second housing having a second display unit; a detecting unit; and a control unit. The detecting unit detects a first form in which the first display unit is exposed to the outside and the second display unit is covered by the first housing and a second form in which the first and second display units are exposed to the outside. Then the detecting unit detects a change in the form of the electronic device from the first form to the second form, the control unit activates a function corresponding to a selected object among objects displayed on the first display unit, and displays a screen corresponding to the function on the second display unit.

12 Claims, 22 Drawing Sheets

(51) Int. Cl.
*G06F 3/0481* (2013.01)
*H04M 1/725* (2006.01)

(52) U.S. Cl.
CPC ....... *G06F3/04817* (2013.01); *H04M 1/72569* (2013.01); *H04M 2250/16* (2013.01); *H04M 2250/22* (2013.01)

(56) References Cited

U.S. PATENT DOCUMENTS

| | | | |
|---|---|---|---|
| 2006/0293088 A1 | 12/2006 | Kokubo | |
| 2009/0051666 A1* | 2/2009 | Choi et al. | 345/173 |
| 2010/0262928 A1* | 10/2010 | Abbott | 715/769 |
| 2010/0285845 A1* | 11/2010 | Sawada et al. | 455/566 |

FOREIGN PATENT DOCUMENTS

| | | |
|---|---|---|
| JP | 2004-304725 A | 10/2004 |
| JP | 200854139 A | 3/2008 |
| JP | 2009-164794 A | 7/2009 |
| WO | 03077097 A1 | 9/2003 |

OTHER PUBLICATIONS

Editorial office of Dekiru Series, Dekiru Encyclopedia (Windows XP SP3&SP2 supported), Impress Corporation, Dec. 1, 2008, first edition, pp. 38, 43, 72, 115, 124-127, 173, 174, 316, and 427.

"PreHome'—You can see running apps in one view and switch tasks ever so easily!—/ andronavi Find your favorite smartphone apps!", [online], Jul. 27, 2010, [searched on May 20, 2014], Internet, <URL: http://andronavi.com/2010/07/30715>.

International Search Report and Written Opinion corresponding to PCT/JP2011/073947, dated Jan. 31, 2012.

Office Action mailed Jul. 1, 2014, corresponds to Japanese patent application No. 2010-241546, for which an explanation of relevance is attached.

* cited by examiner

| ID | CORRESPONDING FUNCTION | DISPLAY POSITION | PICTO-GRAM | PROCESS IN SUSPENSION | SELECT |
|---|---|---|---|---|---|
| 1 | WEB BROWSER | 1 | browser.ico | – | 0 |
| 2 | EMAIL | 2 | mail.ico | – | 0 |
| 3 | EMAIL | 3 | mail.ico | 72 | 1 |

9D

FIG.13
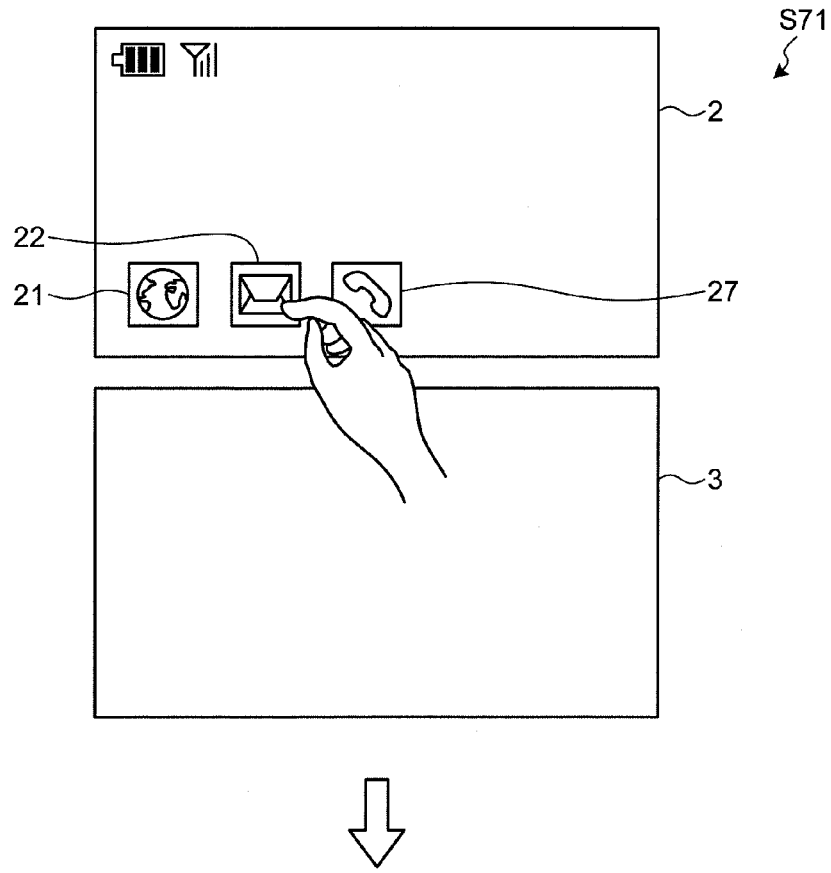
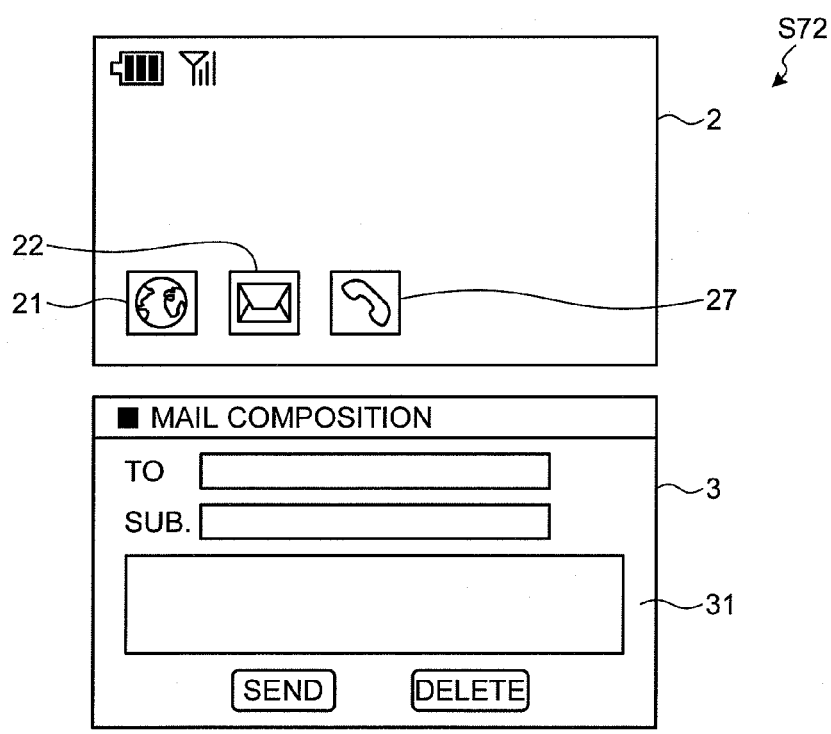

FIG.14A
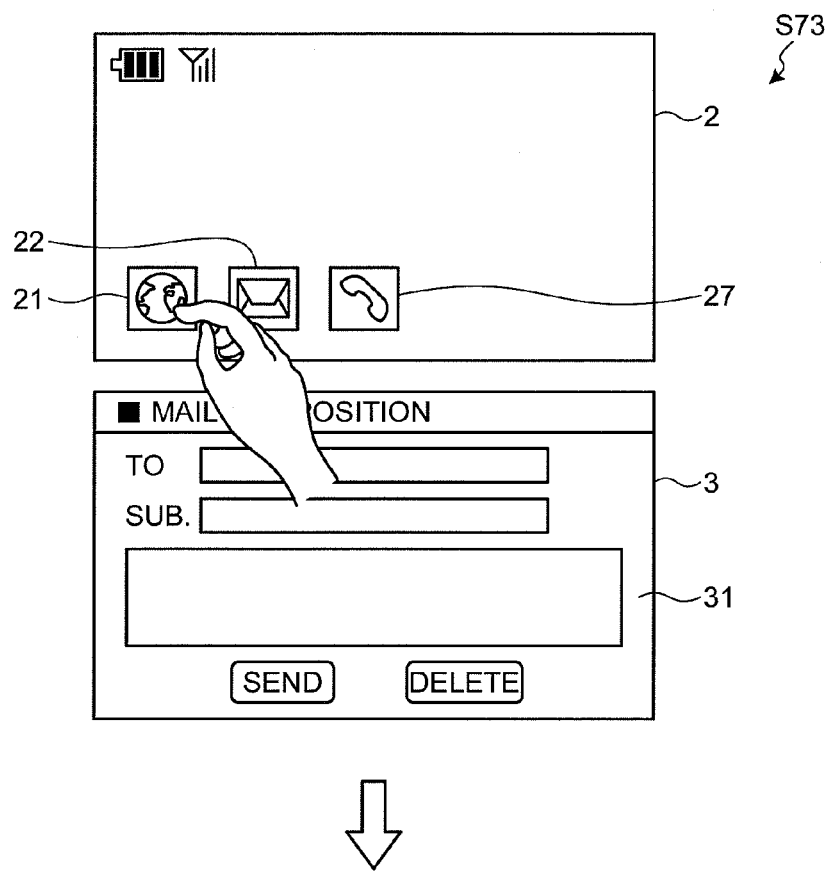
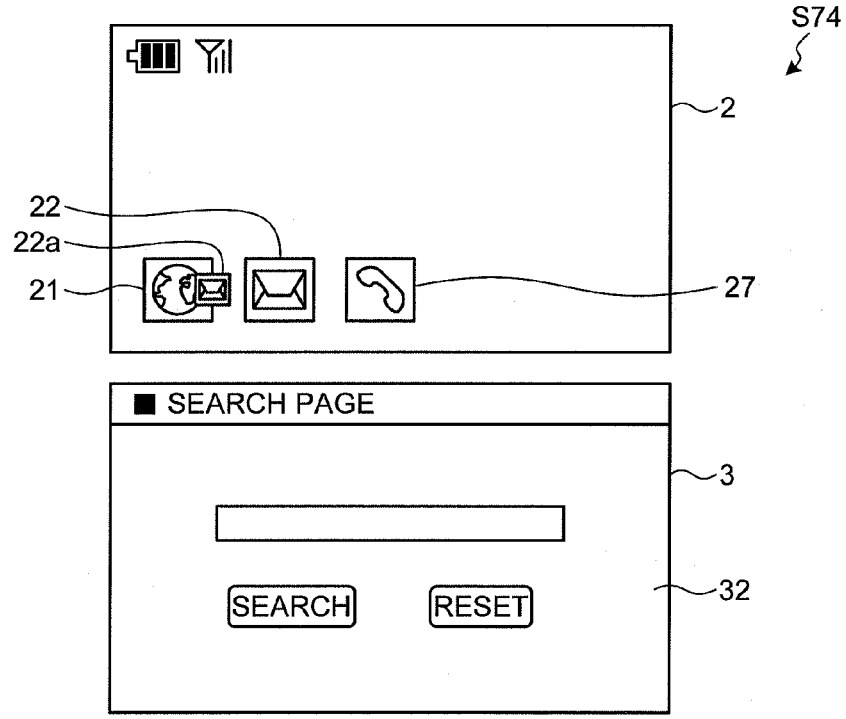

FIG.17
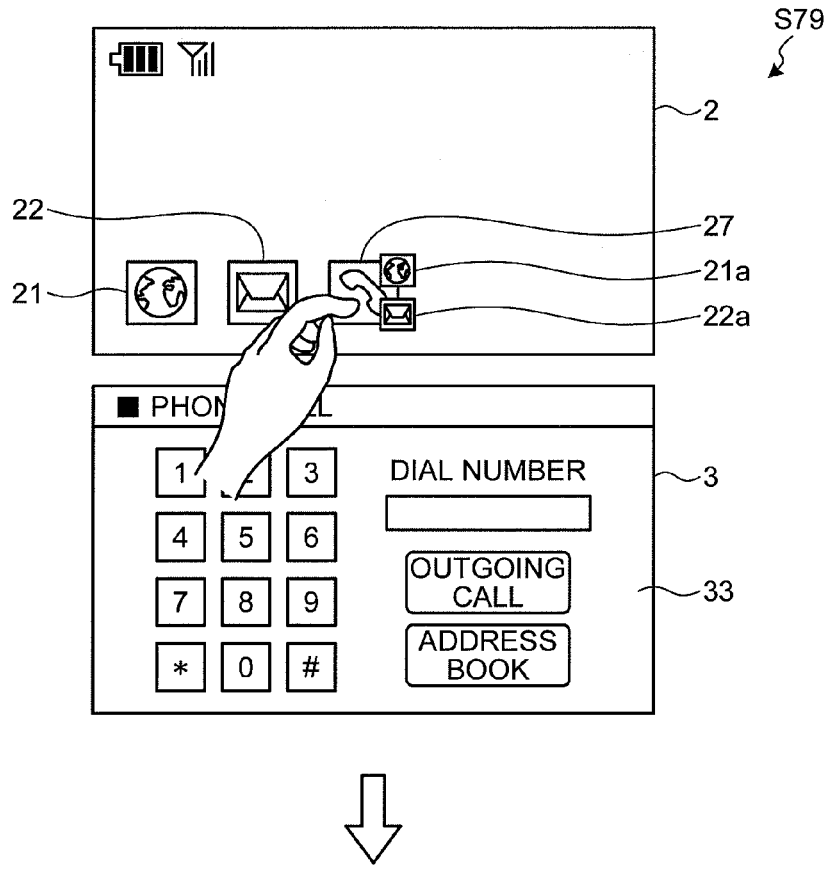
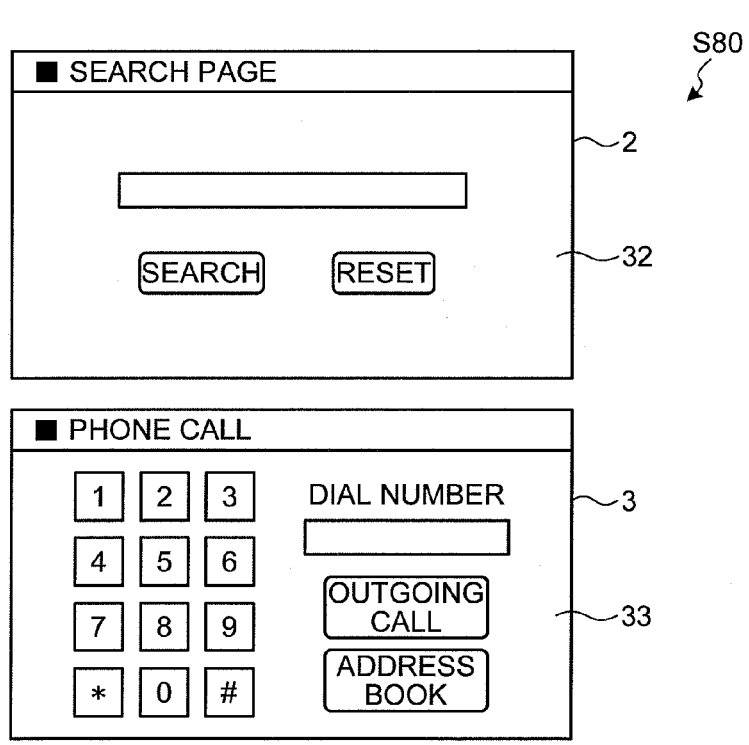

FIG.18
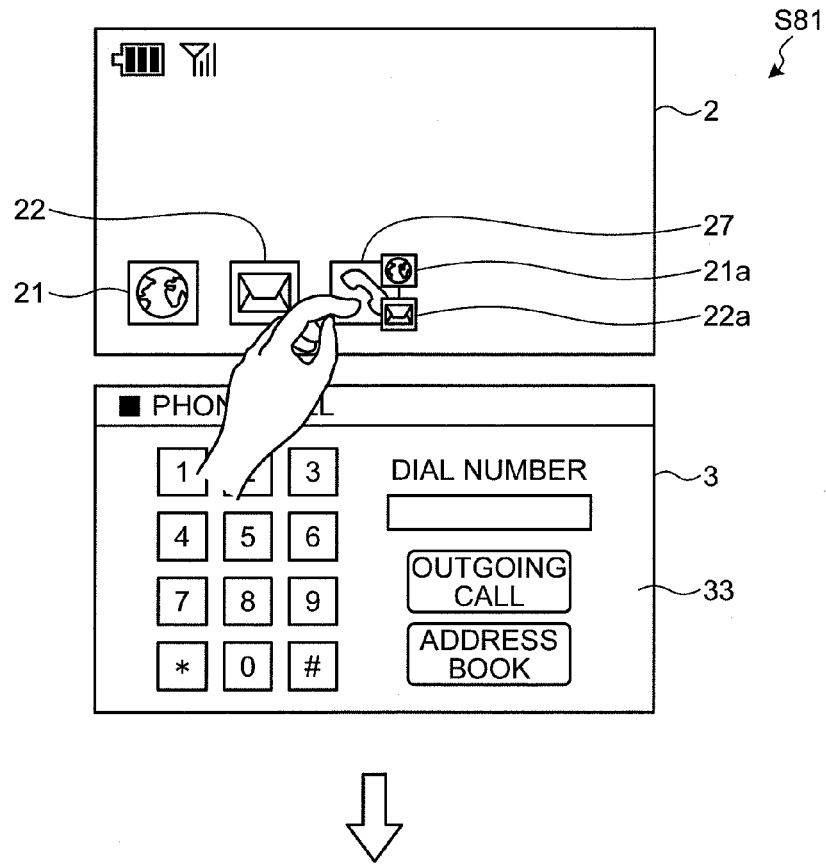
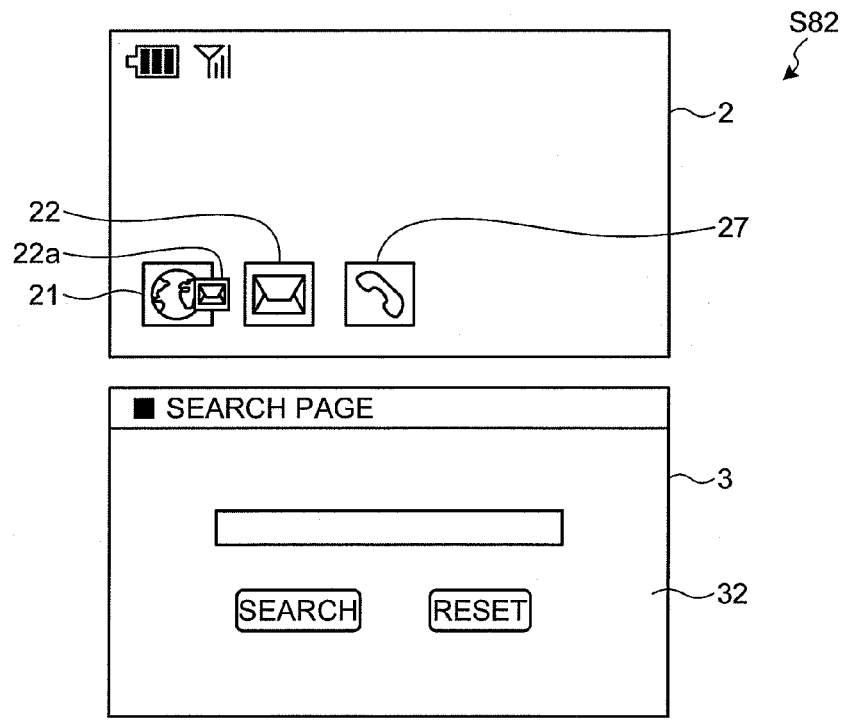

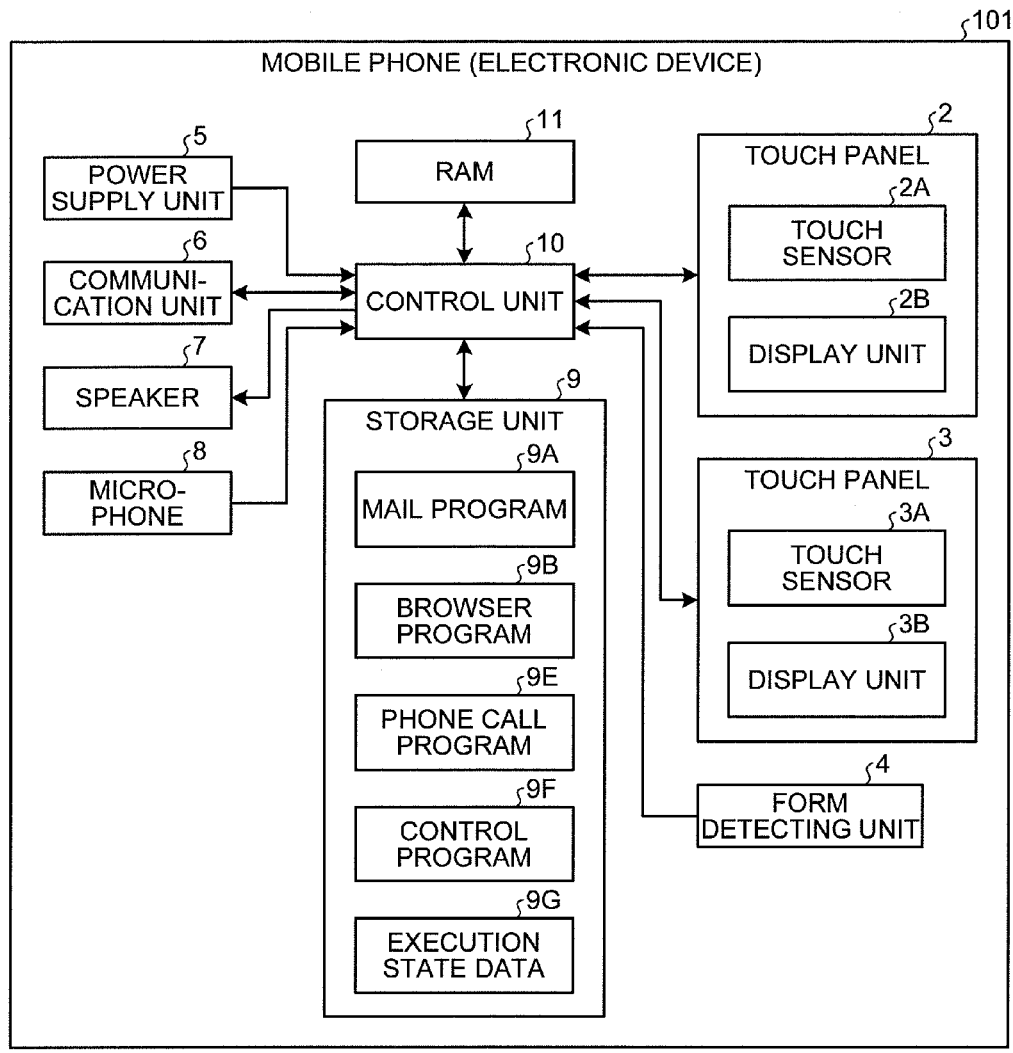

ELECTRONIC DEVICE HAVING A DISPLAY DISPLAYING A SYMBOL INDICATING EXECUTION OF A FUNCTION

CROSS-REFERENCE TO RELATED APPLICATION

This application is a National Stage of PCT international application Ser. No. PCT/JP2011/073947 filed on Oct. 18, 2011 which designates the United States, and which is based upon and claims the benefit of priority from Japanese Patent Application No. 2010-234085, filed on Oct. 18, 2010, and Japanese Patent Application No. 2010-241546, filed on Oct. 27, 2010.

FIELD

The present disclosure relates to an electronic device, a control method, and a control program.

BACKGROUND

In recent years, a touch panel has been widely used to enable intuitive operations and realize a small electronic device that does not include a device that requires a large physical area such as a keyboard. Patent Literature 1 proposes a phone that includes two touch panels, in which the state thereof changes between an open state where the two touch panels are exposed and a closed state where only one touch panel is exposed, and a phone call with an originator, received in the open state, is established in response to the change from the open state to the closed state.

CITATION LIST

Patent Literature

Patent Literature 1: JP 2009-164794 A

Technical Problem

Although the technique disclosed in Patent Literature 1 can improve the user's convenience on operations regarding phone calls, no special consideration of operations regarding the other functions of the electronic device has been taken into account. Electronic devices in the recent years have a wide variety of functions, and it is a demand for improving the user's convenience on operations regarding functions other than phone calls.

For the foregoing reasons, there is a need for an electronic device, a control method, and a control program capable of improving the user's convenience.

SUMMARY

According to an aspect of the present invention, an electronic device includes: a first housing having a first display unit; a second housing having a second display unit; a detecting unit for detecting a first form in which the first display unit is exposed to the outside and the second display unit is covered by the first housing and a second form in which the first and second display units are exposed to the outside; and a control unit configured to, when the detecting unit detects a change in the form of the electronic device from the first form to the second form, activate a function corresponding to a selected object among objects displayed on the first display unit, and display a screen corresponding to the function on the second display unit.

According to an aspect of the present invention, a control method is for controlling an electronic device that includes a first housing having a first display unit, a second housing having a second display unit, and a detecting unit. The control method includes: detecting, by the detecting unit, a change in a form of the electronic device from a first form in which the first display unit is exposed to the outside and the second display unit is covered by the first housing to a second form in which the first and second display units are exposed to the outside; and upon the detecting the change in the form of the electronic device to the second form, activating a function corresponding to a selected object among objects displayed on the first display unit to display a screen corresponding to the function on the second display unit.

According to an aspect of the present invention, a control program causes, when executed by an electronic device that includes a first housing having a first display unit, a second housing having a second display unit, and a detecting unit, the electronic device to execute: detecting, by the detecting unit, a change in a form of the electronic device from a first form in which the first display unit is exposed to the outside and the second display unit is covered by the first housing to a second form in which the first and second display units are exposed to the outside; and upon the detecting the change in the form of the electronic device to the second form, activating a function corresponding to a selected object among objects displayed on the first display unit to display a screen corresponding to the function on the second display unit.

Advantageous Effects of Invention

The electronic device, the control method, and the control program according to the present invention can improve the user's convenience.

BRIEF DESCRIPTION OF DRAWINGS

FIG. 13 is a diagram illustrating an example of control when a function is activated in a state where no other function is activated.

FIG. 14A is a diagram illustrating an example of control when a function is activated in a state where one function is activated.

FIG. 17 is a diagram illustrating another example of control when a function in suspension is resumed.

FIG. 18 is a diagram illustrating an example of control when a function in execution is terminated.

FIG. 19 is a block diagram illustrating a functional configuration of a mobile phone according to a second embodiment.

FIG. 20 is a diagram illustrating an example of execution state data.

DESCRIPTION OF EMBODIMENTS

Hereinafter, the present invention will be described in detail with reference to the drawings. The present invention is not limited to the following description. The constituent elements in the following description include those which are easily conceived by those skilled in the art, those which are substantially identical, and those in the scope of so-called equivalents. In the following description, although a mobile phone will be described as an example of an electronic device, the present invention is not limited to the mobile phone but can be applied to various devices having a touch panel, such as personal handyphone systems (PHSs), PDAs, mobile navigation devices, personal computers, media players, electronic document readers, gaming devices, etc.

First Embodiment

Figure 1:
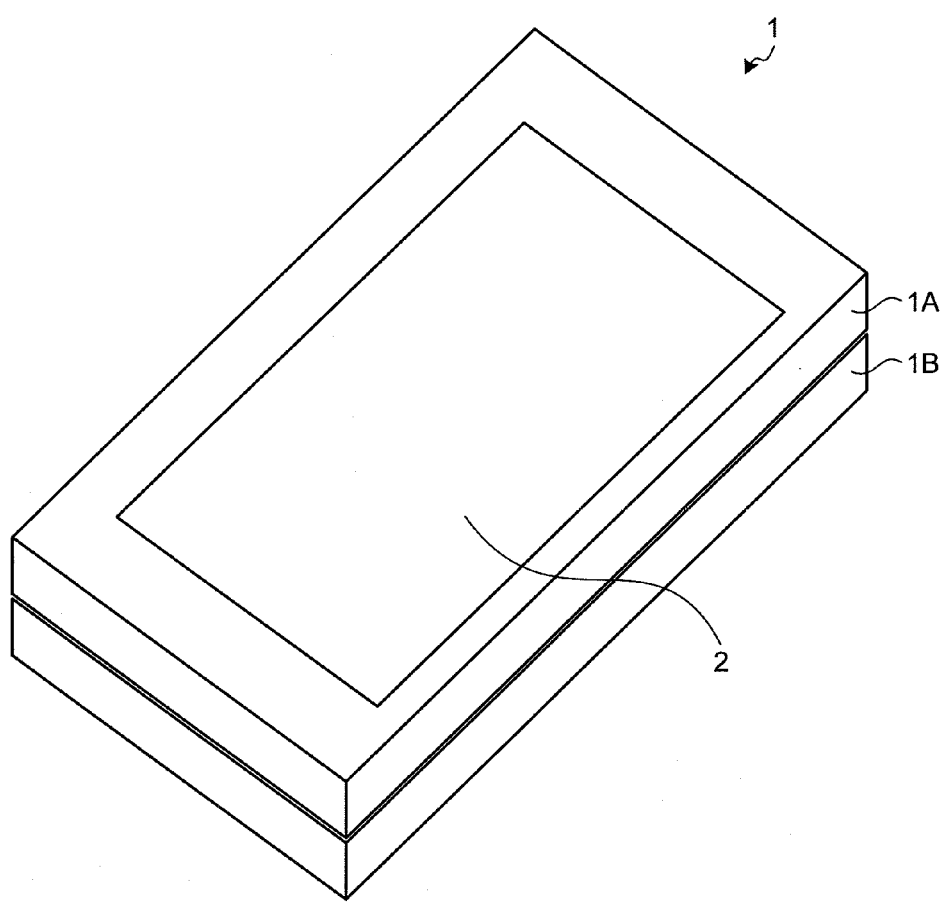
FIG. 1 is a perspective view of a mobile phone in a first form.
Figure 2:
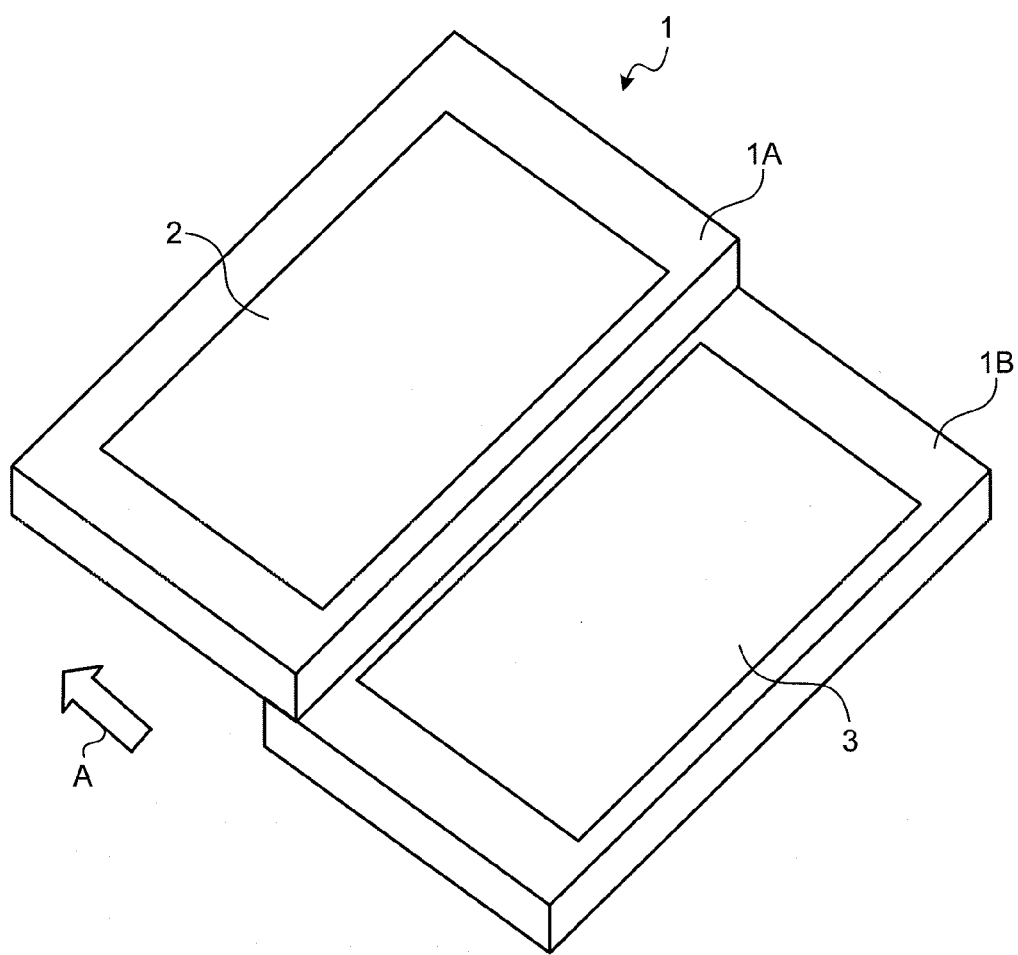
FIG. 2 is a perspective view of the mobile phone in a second form.

First of all, the appearance of a mobile phone 1 according to the present embodiment will be described with reference to FIGS. 1 and 2. FIG. 1 is a perspective view of the mobile phone 1 in a first form, and FIG. 2 is a perspective view of the mobile phone 1 in a second form. The mobile phone 1 includes a first housing 1A and a second housing 1B. The first housing 1A is configured to be relatively slidable with respect to the second housing 1B in the direction indicated by arrow A.

The first housing 1A has a touch panel 2 on a face opposite to the face facing the second housing 1B. The second housing 1B has a touch panel 3 on the face facing the first housing 1A. The touch panels 2 and 3 display characters, figures, images, and the like and detect various operations that a user performs on the touch panel using a finger, a stylus, or the like (hereinafter simply referred to as a "finger"). The touch panel 3 is covered by the first housing 1A in a first form where the first and second housings 1A and 1B overlap with each other and is exposed to the outside in a second form where the first housing 1A is slid in the direction indicated by arrow A.

The first form is a form that is ideal for the user to carry the mobile phone 1, and even in this form, the user can see the information displayed on the touch panel 2 and operate the touch panel 2 with the finger to input information. The second form is a form that is ideal for the user to use the mobile phone 1, so that the user can see a larger amount of information using both touch panels 2 and 3.

In the following description, the touch panel 2 that is always exposed to the outside may be referred to as a first display unit, and the touch panel 3 that is covered by the first housing 1A in the first form and is exposed to the outside in the second form may be referred to as a second display unit.

Figure 3:
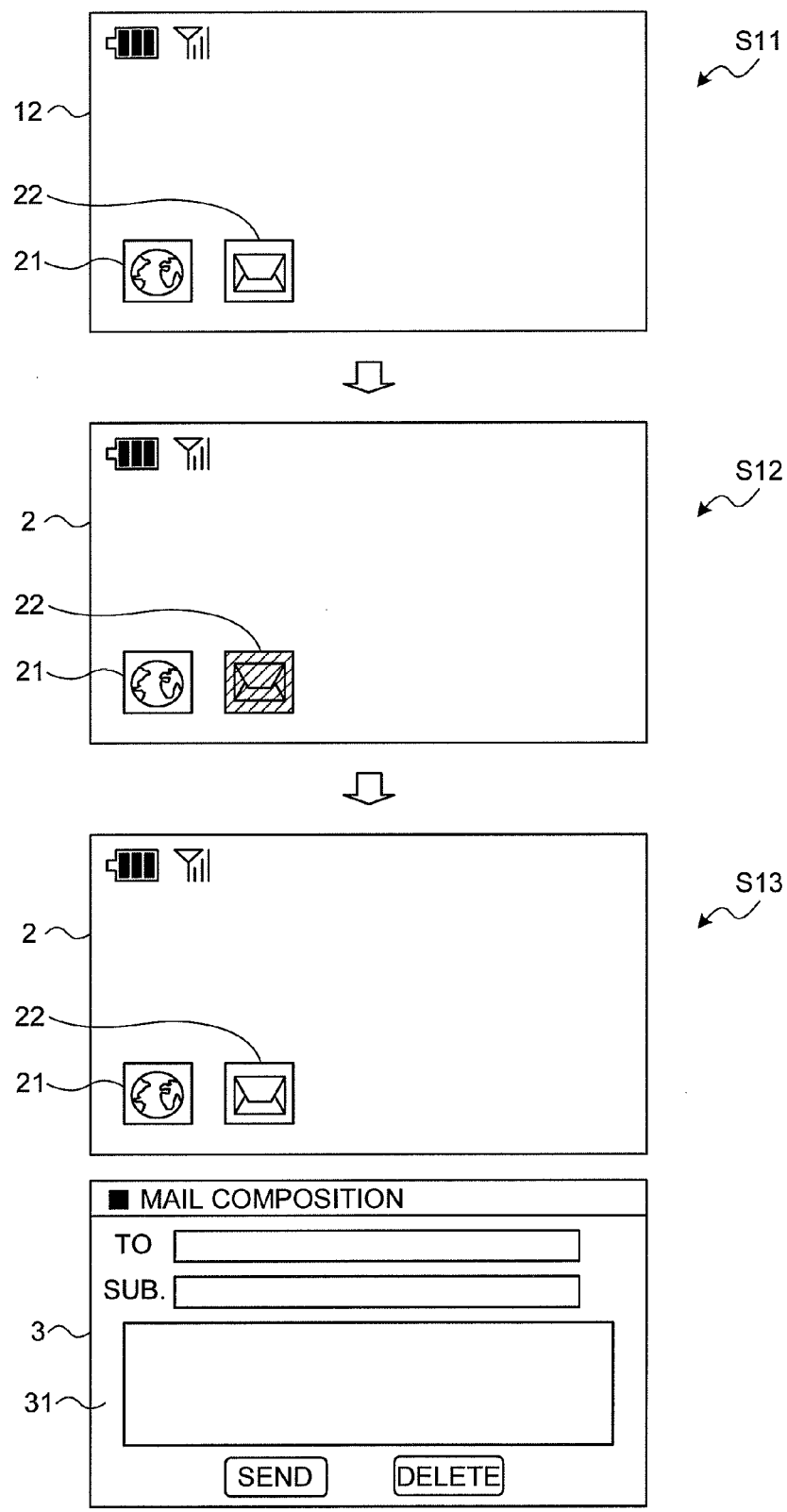
FIG. 3 is a diagram illustrating an example of activating a function in response to a change in form.
Figure 4:
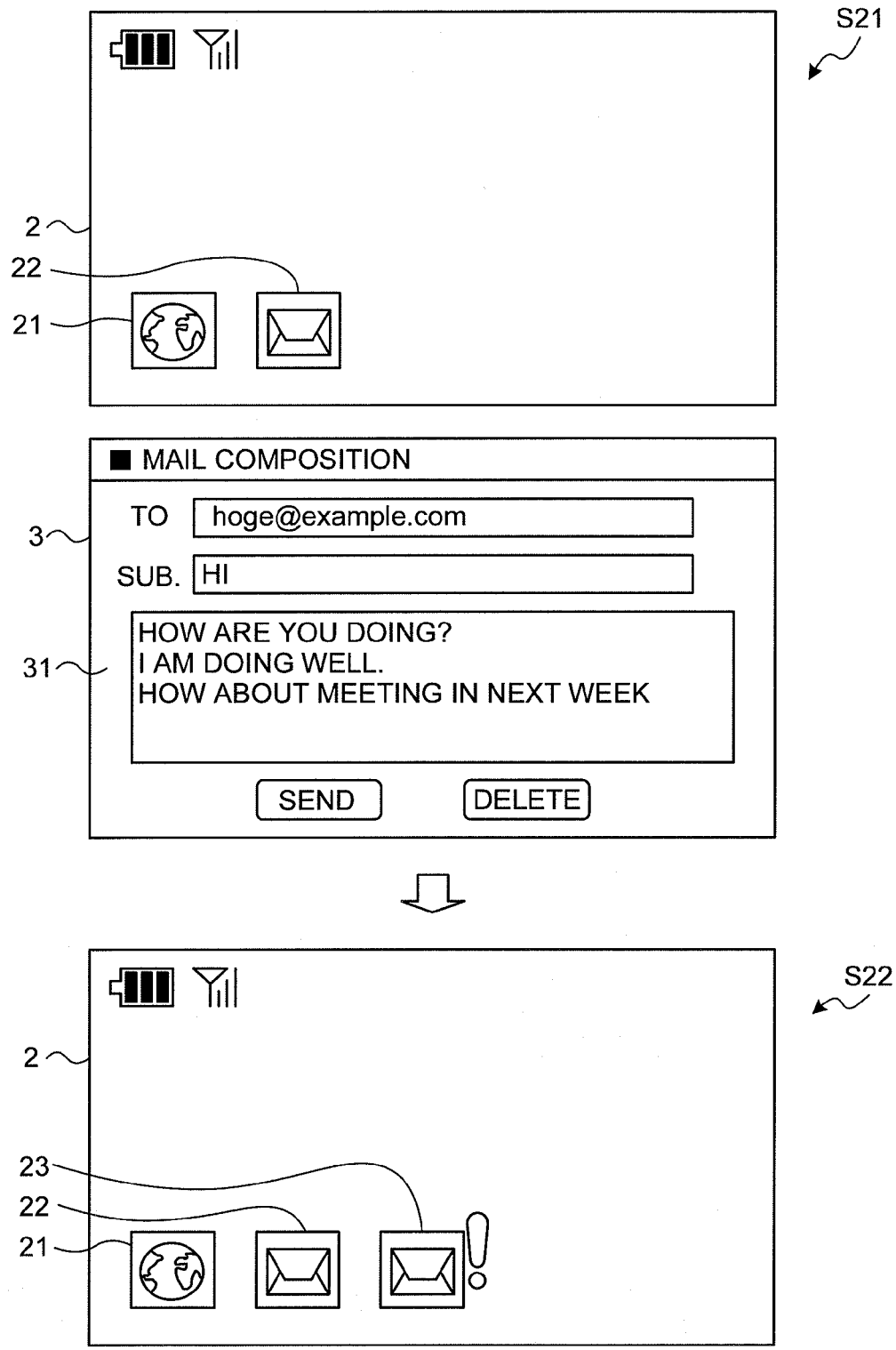
FIG. 4 is a diagram illustrating an example of suspending a function in response to a change in form.
Figure 5:
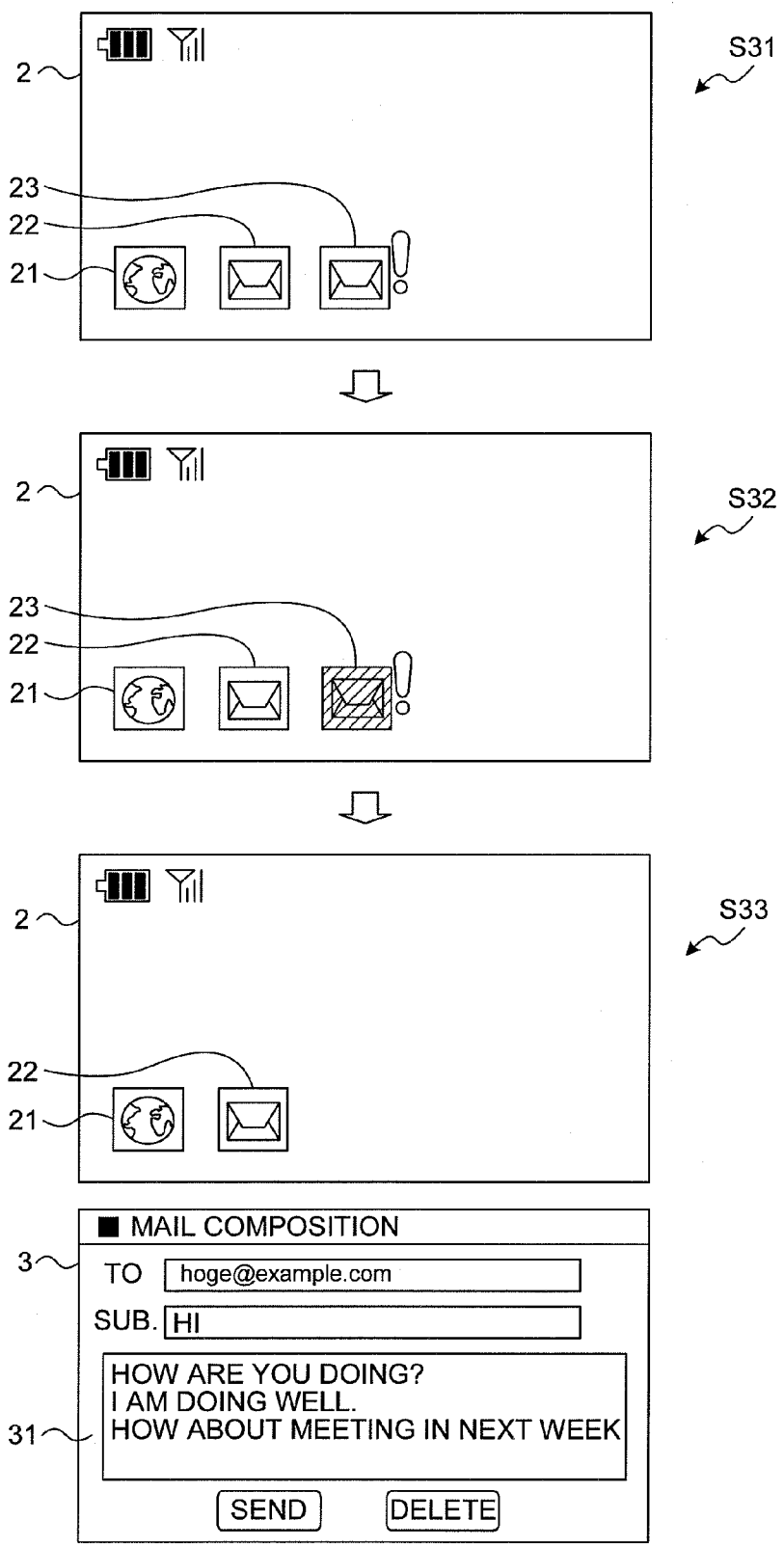
FIG. 5 is a diagram illustrating an example of resuming a function in response to a change in form.

Then, a method of controlling functions in response to a change in the form of the mobile phone 1 will be described with reference to FIGS. 3 to 5. FIG. 3 is a diagram illustrating an example of activating a function in response to a change in form. FIG. 4 is a diagram illustrating an example of suspending a function in response to a change in form. FIG. 5 is a diagram illustrating an example of resuming a function in response to a change in form.

At Step S11 illustrated in FIG. 3, the mobile phone 1 is in the first form, and an idle screen in which icons 21 and 22 are disposed is displayed on the first display unit. The icon 21 is an object used for newly activating a web browsing function, and the icon 22 is an object used for newly activating an email function.

The idle screen is a screen in a state of waiting for incoming and outgoing calls or a screen in a state of waiting for activation of application programs. In other words, the idle screen is a screen displayed before changing into a screen (hereinafter also referred to as a "functional screen") for allowing the user to use various functions provided by the mobile phone 1. The idle screen is sometimes referred to as a desktop screen, a home screen, or a wallpaper, for example. In the example illustrated in FIG. 3, although a plain screen is displayed as the idle screen, image data or animation data may be displayed as the idle screen. A portion that changes dynamically such as a calendar or a clock may be included as a part of the idle screen.

At Step S12, when the user performs a single-tap operation on the icon 22, the mobile phone 1 puts the icon 22 into a selected state. The mobile phone 1 makes the icon 22 in the selected state to be distinguished from other icons by decreasing brightness of the icon 22, for example. The single-tap operation is an operation of performing an operation of touching the touch panel and then immediately releasing a finger therefrom in such a manner of slightly tapping on an icon or the like only once.

At Step S13, it is assumed that the user changed the form of the mobile phone 1 from the first form to the second form while the icon 22 is in the selected state. In this case, the mobile phone 1 activates an email function corresponding to the icon 22 in the selected state on the second display unit. The expression "activating the email function on the second display unit" means activating the email function and displaying a screen provided by the email function on the second display unit. The screen provided by the email function is a mail composition screen 31, for example.

In this manner, when an icon in the selected state is present on the first display unit upon a change from the first form to the second form, the mobile phone 1 activates a function corresponding to the icon on the second display unit. Accordingly, when the user wants to activate a certain function on the second display unit while carrying the mobile phone 1 in the first form, the user puts an icon corresponding to the function into a selected state on the first display unit. By doing so, the user can activate the desired function on the second display unit in response to an operation of putting the mobile phone 1 into the second form to expose the second display unit.

Then, as at Step S21 of FIG. 4, it is assumed that the user puts the mobile phone 1 into the first form in a state where the email function is activated on the second display unit. In this case, at Step S22, the mobile phone 1 suspends the email function that is activated on the second display unit and displays an icon 23 on the first display unit to indicate that the email function is in suspension.

The icon 23 has the same appearance as the icon 22 for activating the email function and an exclamation mark "!" is added thereto so that user can understand that the corresponding function is in suspension. Adding the mark "!" is an example, and an icon representing the function in suspension only has to be distinguished in any manner from an icon for newly activating the function. For example, a thumbnail image of the second display unit immediately before the suspension may be displayed as the icon 23.

In this manner, when the user has to suspend a certain function due to some reason while putting the mobile phone 1 into the second form to use the function on the second display unit, the user can suspend the function by returning the mobile phone 1 to the first form. That is, by returning the mobile phone 1 to the first form where it is easy to carry the mobile phone 1, the user can carry the mobile phone 1 in the hand of the user or put it in a bag as soon as suspending a function that has activated on the second display unit.

Then, as at Step S31 of FIG. 5, it is assumed that the user wants to resume the suspended function in a state where the icon 23 corresponding to the suspended function is displayed on the first display unit. In this case, at Step S32, the user performs a single-tap operation on the icon 23. When a single-tap operation is performed on the icon 23, the mobile phone 1 puts the icon 23 into a selected state.

At Step S33, when the user changes the form of the mobile phone 1 from the first form to the second form while the icon 23 is in the selected state, the mobile phone 1 resumes the email function corresponding to the icon 23 on the second display unit. When the email function is resumed, the mobile phone 1 removes the icon 23 from the first display unit.

In this manner, when an icon corresponding to a function in suspension is in the selected state on the first display unit upon a change from the first form to the second form, the mobile phone 1 resumes the function corresponding to the icon on the second display unit. Accordingly, when the user wants to resumes the function that had been activated on the second display unit, the user puts the icon corresponding to the function into a selected state on the first display unit. By doing so, the user can resume a desired function on the second display unit in response to the operation of putting the mobile phone 1 into the second form to expose the second display unit.

The function in suspension may be resumed on the first display unit rather than the second display unit. An example of resuming the function in suspension on the first display unit will be described with reference to FIG. 6.

Figure 6:
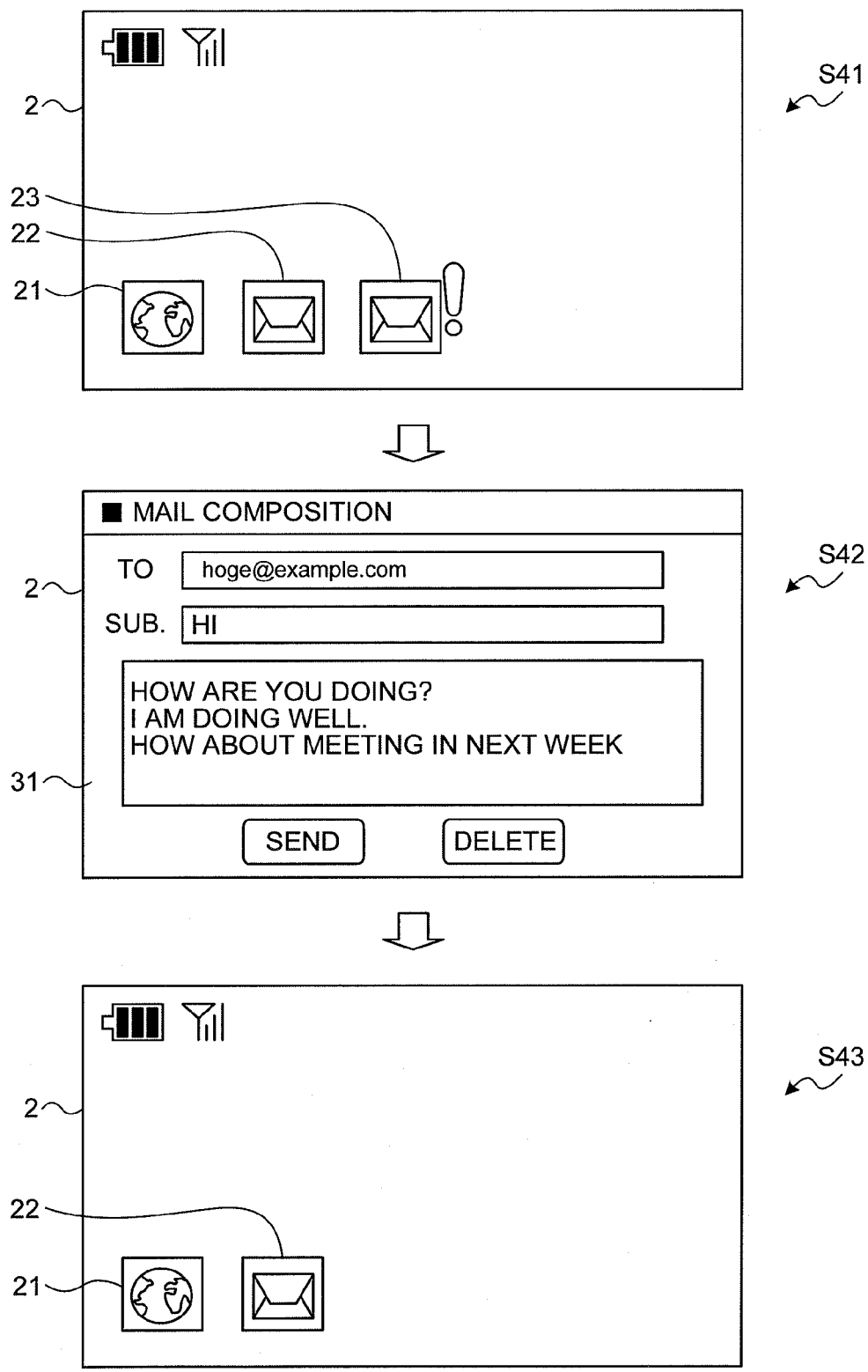
FIG. 6 is a diagram illustrating an example of causing a function in suspension to be resumed on a first display unit.

As at Step S41 of FIG. 6, it is assumed that the user performs a double-tap operation on the icon 23 in a state where the icon 23 corresponding to the suspended function is displayed on the first display unit. The double-tap operation is an operation of performing an operation of touching the touch panel and then immediately releasing a finger therefrom in such a manner of slightly tapping on an icon or the like twice repeatedly.

In this case, at Step S42, the mobile phone 1 resumes the email function corresponding to the icon 23 on the first display unit rather than the second display unit. Also, the mobile phone 1 removes the icon 23 from the first display unit when the email function is resumed. As a result, as indicated at Step S43, the icon 23 is not displayed on the first display unit after the user terminates the email function.

Figure 7:
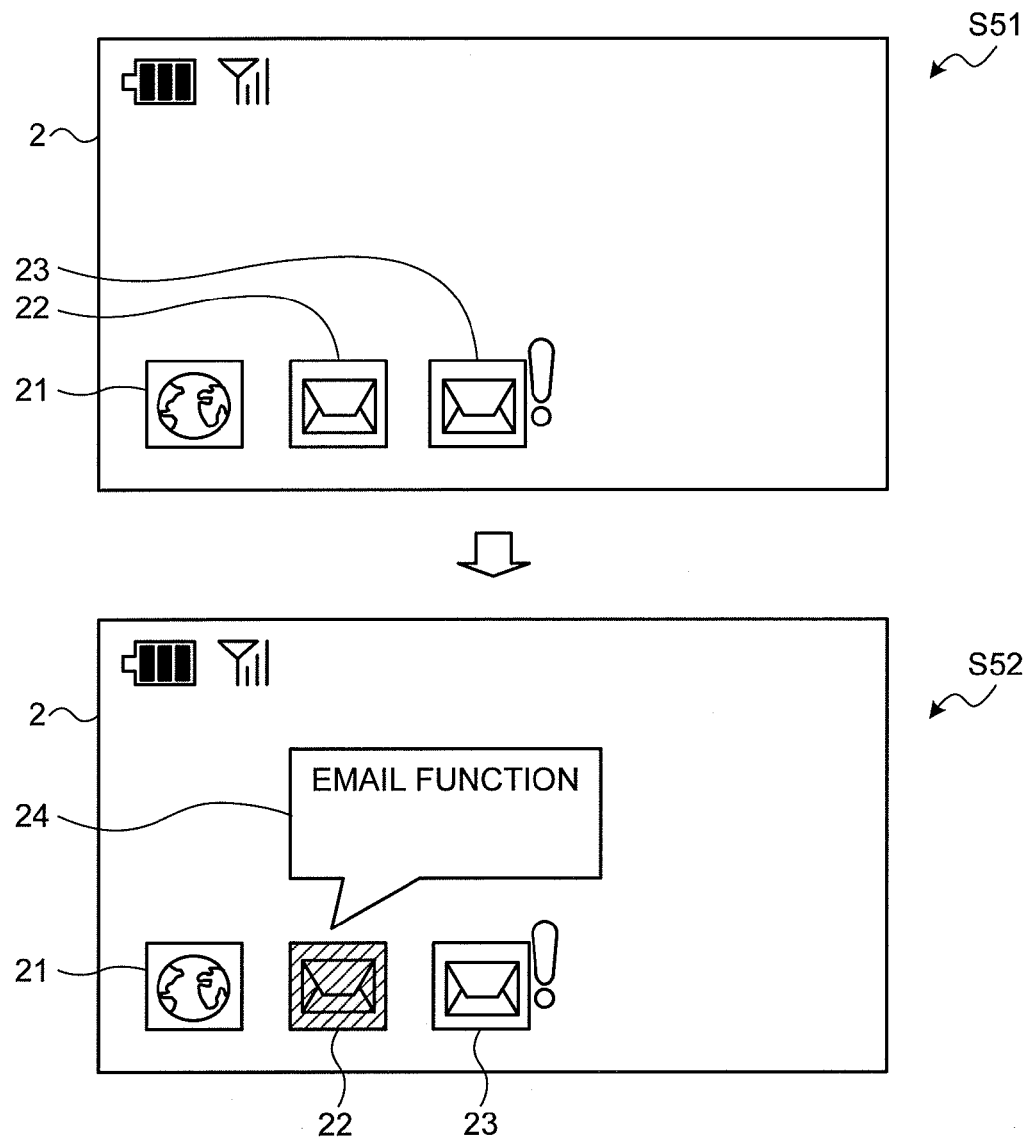
FIG. 7 is a diagram illustrating an example of displaying a description of an icon.

The user can understand the details of a displayed icon by performing a predetermined operation. For example, as at Step S51 of FIG. 7, it is assumed that the user performs a long-tap operation on the icon 22 in a state where the icon 22 corresponding to the email function is displayed on the first display unit. The long-tap operation is an operation of touching a touch panel with a finger longer than a predetermined period in such a manner of pressing an icon or the like.

In this case, at Step S52, the mobile phone 1 puts the icon 22 into a selected state and informs the user of the function corresponding to the icon 22 by displaying a balloon 24 or the like on the first display unit to indicate that the function corresponding to the icon 22 is an email function. The balloon 24 may be displayed when the contact of the finger with the touch panel lasts longer than a predetermined period. In this case, the balloon 24 may be removed when the finger is separated from the touch panel. The balloon 24 may be displayed when the finger is separated from the touch panel. In this case, the balloon 24 may be removed when a predetermined period has elapsed after the finger is separated from the touch panel.

Figure 8:
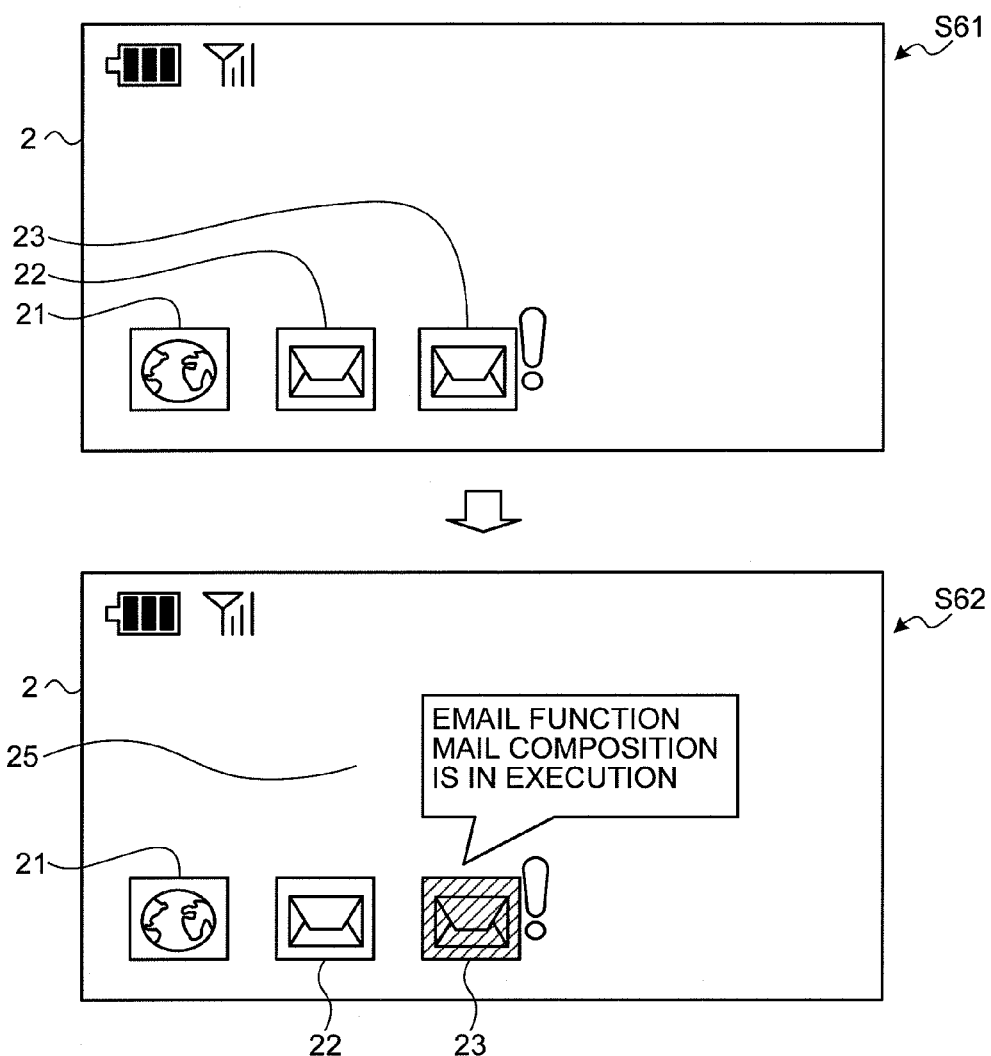
FIG. 8 is a diagram illustrating another example of displaying a description of an icon.

Similarly, as at Step S61 of FIG. 8, it is assumed that the user performs a long-tap operation on the icon 23 in a state where the icon 23 corresponding to an email function in suspension is displayed on the first display unit. In this case, at Step S62, the mobile phone 1 puts the icon 23 into a selected state and displays a balloon 25 or the like that indicates that the function corresponding to the icon 23 is an email function and is suspended during execution of email composition, thereby informing the user of the function corresponding to the icon 23 and the process suspended during execution thereof.

Figures 9, 10:
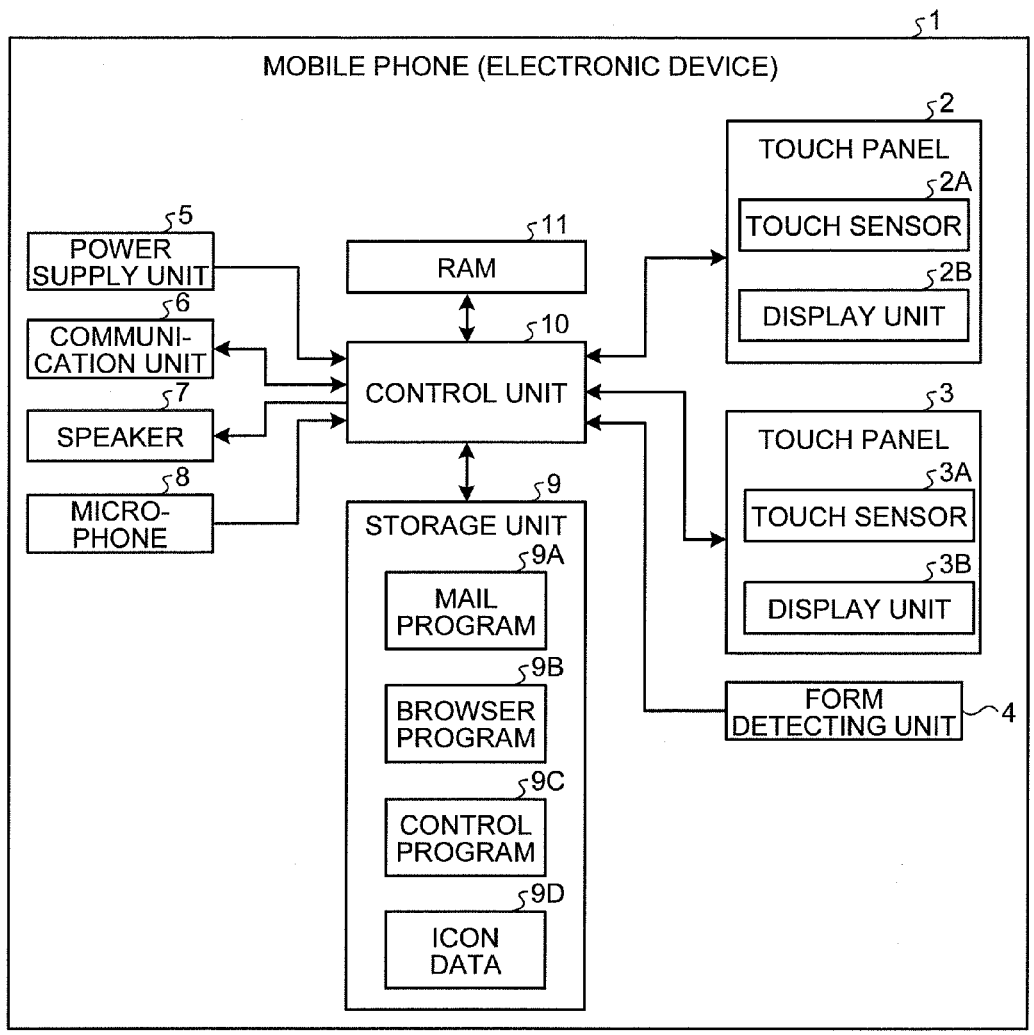
FIG. 9 is a block diagram illustrating a functional configuration of the mobile phone according to a first embodiment.
FIG. 10 is a diagram illustrating an example of icon data.

Then, a functional configuration of the mobile phone 1 will be described with reference to FIG. 9. FIG. 9 is a block diagram illustrating a functional configuration of the mobile phone 1. As illustrated in FIG. 9, the mobile phone 1 includes the touch panel 2, the touch panel 3, a form detecting unit 4, a power supply unit 5, a communication unit 6, a speaker 7, a microphone 8, a storage unit 9, a control unit 10, and a random access memory (RAM) 11. The touch panel 2 is provided in the first housing 1A, the touch panel 3 is provided in the second housing 1B, and the other units may be provided any one of the first and second housings 1A and 1B.

The touch panel 2 includes a display unit 2B and a touch sensor 2A that is superimposed on the display unit 2B. The touch panel 3 includes a display unit 3B and a touch sensor 3A that is superimposed on the display unit 3B. The touch sensors 2A and 3A detect various operations performed on the surface using a finger and the position of the operation. The operations detected by the touch sensors 2A and 3A include a single-tap operation, a double-tap operation, a long-tap operation, and the like. The display units 2B and 3B are provided with a liquid crystal display (LCD), an organic electro-luminescence (EL) panel, or the like, for example, and display characters, figures, images, and the like.

The form detecting unit 4 detects whether the mobile phone 1 is in the first form or in the second form. For example, the form detecting unit 4 detects the form of the mobile phone 1 using a mechanical switch formed on a face that the first and second housings 1A and 1B face.

The power supply unit 5 supplies power obtained from a battery or an external power supply to each of functional units of the mobile phone 1 including the control unit 10. The communication unit 6 establishes a wireless path with a base station via a channel allocated to the base station based on a CDMA system or the like and performs telephone communication and information communication with the base station. The speaker 7 outputs the voice of a counterpart of the telephone communication, a ring tone and the like. The microphone 8 converts the voice of a user or the like into electrical signals.

The storage unit 9 includes at least one of non-transitory storage devices such as a nonvolatile memory (a ROM, an EPROM, a memory card, a solid-state device, or the like), a magnetic memory device, and an optical memory device, for example, and stores programs and data used for the process of the control unit 10. Specifically, the storage unit 9 stores a mail program 9A for implementing an email function, a browser program 9B for implementing a web browsing function, a control program 9C for implementing control of the above-described functions, and icon data 9D in which information on icons to be displayed on the screen is stored. In addition, the storage unit 9 stores other programs and data such as an operating system program that implements basic functions of the mobile phone 1 and address book data in which names, telephone numbers, mail addresses, and the like are registered.

The icon data 9D will be described with reference to FIG. 10. FIG. 10 is a diagram illustrating an example of the icon data 9D. As illustrated in FIG. 10, the icon data 9D includes items such as ID, Corresponding Function, Display Position, Pictograph, Process in Suspension, and Select. An identification number of an icon is stored in the ID item. Information for specifying a function corresponding to the icon is stored in the Corresponding Function item. Information for specifying a display position of the icon is stored in the Display Position item.

Information for specifying an object to be displayed as the icon is stored in the Pictogram item. A number for specifying a process which is an actual substance of the suspended function is stored in the Process in Suspension item when the corresponding function is in suspension. The process means a program that is loaded into the RAM 11 by the control unit 10 and is in an executable state. When the function corresponding to the icon is newly activated, the Process in Suspension item is set empty. A value indicating whether the icon is in a selected state is stored in the Select item. For example, "1" stored in the Select item indicates that the corresponding icon is in the selected state, whereas "0" stored in the Select item indicates that the corresponding icon is not in the selected state.

The control unit 10 is a central processing unit (CPU), for example, and integrally controls the operations of the mobile phone 1. Specifically, the control unit 10 executes programs stored in the storage unit 9 while referring to data stored in the storage unit 9 as necessary to control the touch panel 2, the communication unit 6, and the like, thereby executing various processes. The control unit 10 loads programs stored in the storage unit 9 and data acquired, generated, or processed by execution of processes into the RAM 11 that provides temporarily a storage area as necessary. The programs to be executed and/or the data to be referred to by the control unit 10 may be downloaded from a server via the wireless communication of the communication unit 6.

For example, the control unit 10 implements an email function by executing the mail program 9A. The control unit 10 executes the control program 9C to thereby control the execution state of various programs in response to an operation of the user and a change in the form of the mobile phone 1.

Then, the procedures executed by the control unit 10 based on the control program 9C will be described with reference to FIGS. 11 and 12. The procedures illustrated in FIGS. 11 and 12 are repeatedly executed when the mobile phone 1 is operating.

Figure 11:
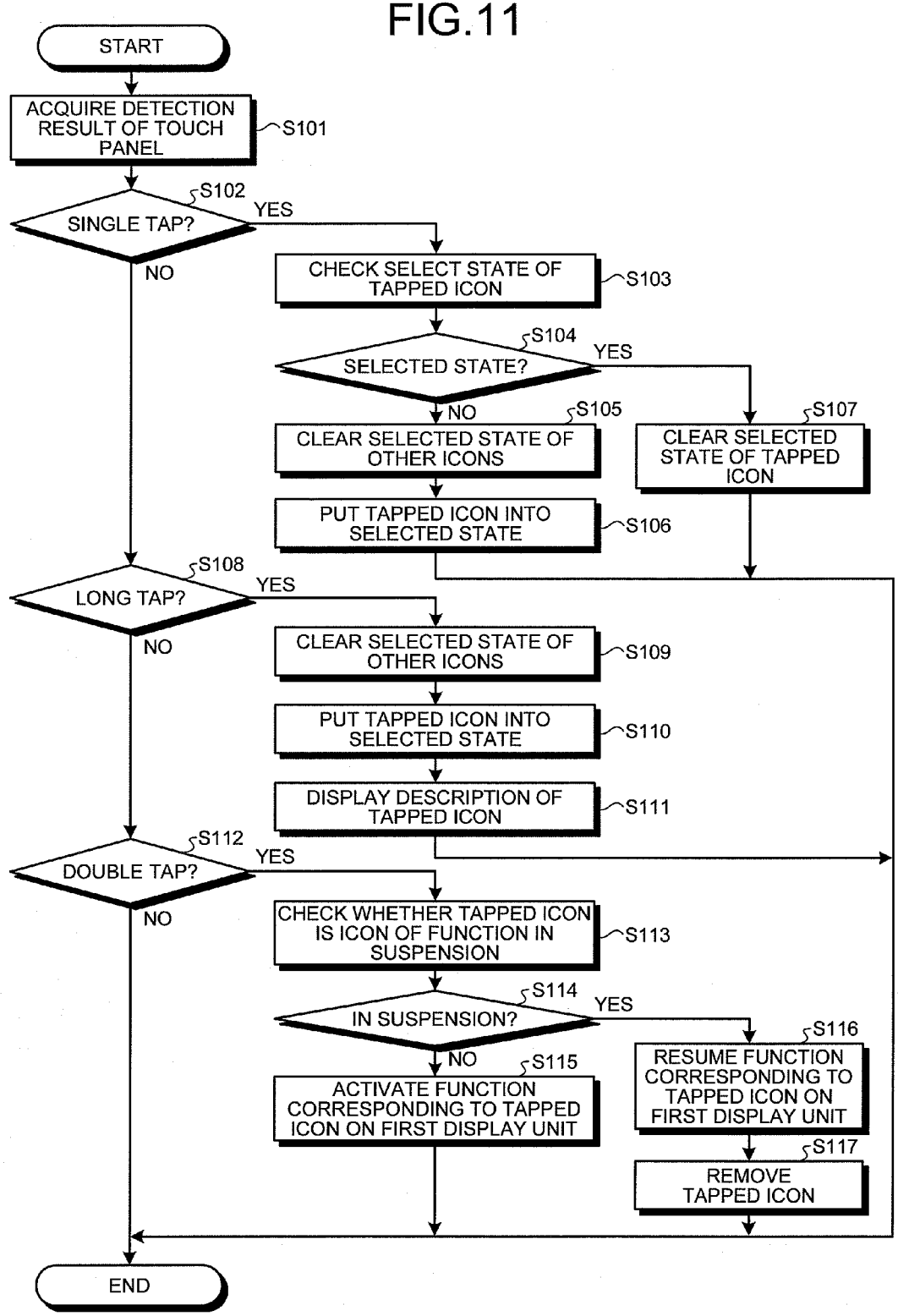
FIG. 11 is a flowchart illustrating a procedure when an operation on an icon on a first display unit is detected.
Figure 12:
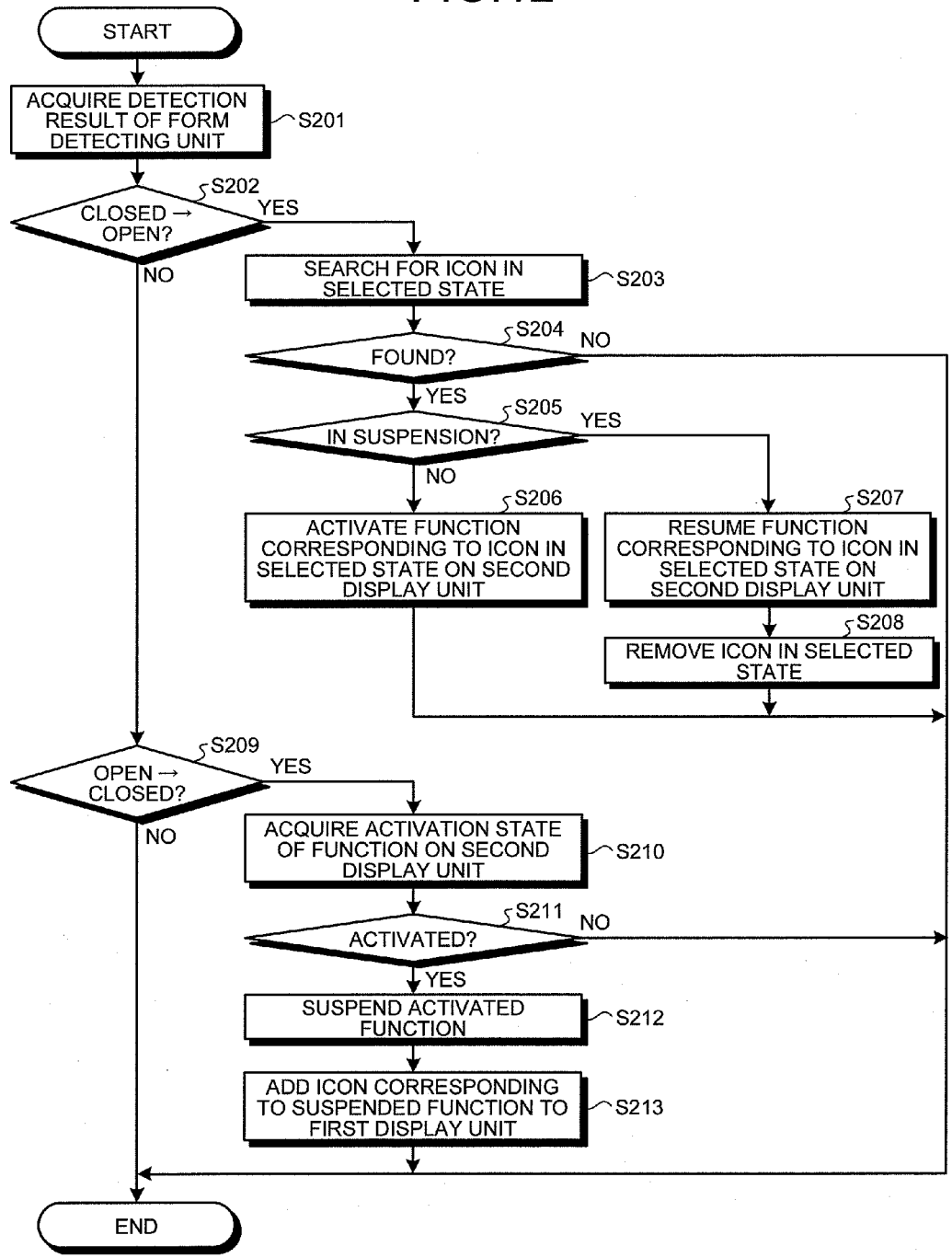
FIG. 12 is a flowchart illustrating a procedure when the form of the mobile phone is changed.

FIG. 11 is a flowchart illustrating a procedure when an operation on an icon on the first display unit is detected. As illustrated in FIG. 11, at Step S101, the control unit 10 acquires the detection results of the touch panel 2 (the first display unit). When the operation detected by the touch panel 2 is a single-tap operation on an icon (Yes at Step S102), then 9D at Step S103, the control unit 10 checks whether the tapped icon is in a selected state by referring to the icon data.

When the tapped icon is not in the selected state (No at Step S104), the control unit 10 clears the selected states of the other icons at Step S105, and puts the tapped icon into a selected state at Step S106. On the other hand, when the tapped icon is in the selected state (Yes at Step S104), the control unit 10 clears the selected state of the tapped icon at Step S107. Setting and clearing of the selected state is realized by updating the value of the Select item of the icon data 9D and changing a display mode of an icon on the first display unit.

When the operation detected by the touch panel 2 is a long-tap operation on an icon (No at Step S102, and Yes at S108), the control unit 10 clears the selected states of other icons at Step S109, and puts the tapped icon into a selected state at Step S110. Moreover, the control unit 10 displays a description of the tapped icon on the first display unit in a form such as a balloon at Step S111. Specifically, when determining, by referring to the icon data 9D, that the tapped icon newly activates a function, the control unit 10 displays a description of the function. On the other hand, when determining that the tapped icon corresponds to a suspended function, the control unit 10 displays a description of the function and a description on the execution state thereof upon the suspension.

When the operation detected by the touch panel 2 is a double-tap operation on an icon (No at Step S108, and Yes at Step S112), then at Step S113, the control unit 10 refers to the icon data 9D to check whether the tapped icon corresponds to a suspended function. When the tapped icon does not correspond to a suspended function (No at Step S114), the control unit 10 newly activates the function corresponding to the tapped icon on the first display unit at Step S115.

On the other hand, when the tapped icon corresponds to a suspended function (Yes at Step S114), the control unit 10 resumes the function corresponding to the tapped icon on the first display unit at Step S116. Also, the control unit 10 removes the tapped icon at Step S117.

FIG. 12 is a flowchart illustrating a procedure when the form of the mobile phone 1 is changed. As illustrated in FIG. 12, the control unit 10 acquires the detection results of the form detecting unit 4 at Step S201.

When the form detecting unit 4 detects a change from the first form to the second form, that is, a change from a closed state to an open state (Yes at Step S202), then at Step S203, the control unit 10 refers to the icon data 9D to searches for an icon in the selected state. When no icon is in the selected state (No at Step S204), the control unit 10 does not perform any particular process.

On the other hand, when there is an icon in the selected state (Yes at Step S204), then at Step S205, the control unit 10 determines whether the icon corresponds to a suspended function. When the icon in the selected state does not correspond to a suspended function (No at Step S205), the control unit 10 newly activates the function corresponding to the icon in the selected state on the second display unit at Step S206. When the icon in the selected state corresponds to the suspended function (Yes at Step S205), the control unit 10 resumes the function corresponding to the icon in the selected state on the second display unit at Step S207. Also, the control unit 10 removes the icon in the selected state at Step S208.

When the form detecting unit 4 detects a change from the second form to the first form, that is, a change from the open state to the closed state (No at Step S202, and Yes at Step S209), the control unit 10 acquires an activation state of a function on the second display unit at Step S210. The activation state of a function can be acquired from a process management table provided in the RAM 11, for example.

When a function is activated on the second display unit (Yes at Step S211), the control unit 10 suspends the activated function at Step S212, and adds an icon corresponding to the suspended function to the first display unit at Step S213. In this case, the control unit 10 adds information on the icon corresponding to the suspended function to the icon data 9D. On the other hand, when no function is activated on the second display unit (No at Step S211), the control unit 10 does not perform any particular process.

As described above, in the present embodiment, since activation, suspension, and resumption of functions are performed in response to a change in the form of the mobile phone 1, it is possible to simplify operations regarding activation or the like of functions and to improve the user's convenience.

In the first embodiment, an icon is put into a selected state in response to a single-tap operation, a function corresponding to an icon is activated on the same screen in response to a double-tap operation, and an icon is put into a selected state and a description of the icon is displayed in response to a long-tap operation. However, allocations of operations are not limited to the above example. For example, an icon may be put into a selected state in response to a long-tap operation, a function corresponding to an icon may be activated on the same screen in response to a single-tap operation, and an icon may be put into a selected state and a description of the icon may be displayed in response to a double-tap operation. A menu may be displayed near the icon tapped by a single-tap operation or the like so that the user selects which process will be performed in relation to the icon.

Second Embodiment

A second embodiment will be described below. In the following description, the same portions as those described above will be denoted by the same reference numerals as the above-described portions, and redundant description thereof may not be provided.

A mobile phone 101 according to this embodiment has the same appearance as the mobile phone 1. That is, the mobile phone 101 includes a first housing 1A and a second housing 1B. The first housing 1A is configured so as to be relatively slidable with respect to the second housing 1B. The first housing 1A has a touch panel 2 on a face opposite to the face facing the second housing 1B. The second housing 1B has a touch panel 3 on the face facing the first housing 1A. The touch panel 3 is covered by the first housing 1A in a first form where the first and second housings 1A and 1B overlap with each other and is exposed to the outside in a second form where the first housing 1A is slid in the direction indicated by arrow A.

In the following description, the touch panel 2 that is always exposed to the outside may be referred to as a first display unit, and the touch panel 3 that is covered by the first housing 1A in the first form and is exposed to the outside in the second form may be referred to as a second display unit. The touch panels 2 and 3 may be referred to simply as a display unit without distinguishing them.

Figure 14B:
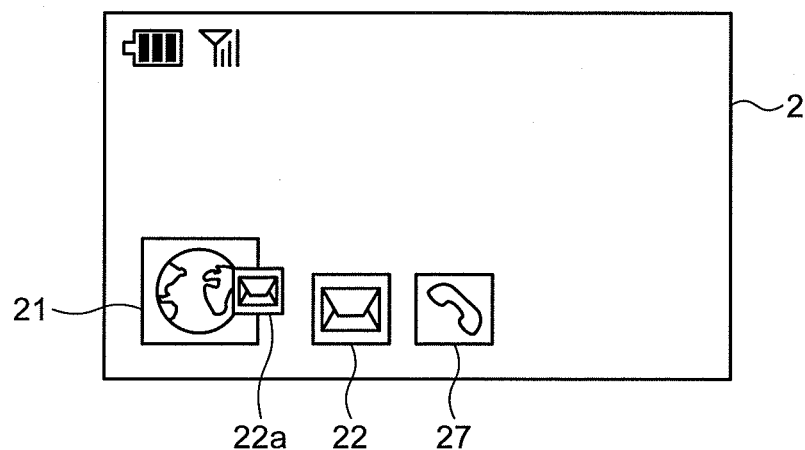
FIG. 14B is a diagram illustrating another example of control when a function is activated in a state where one function is activated.
Figure 14C:
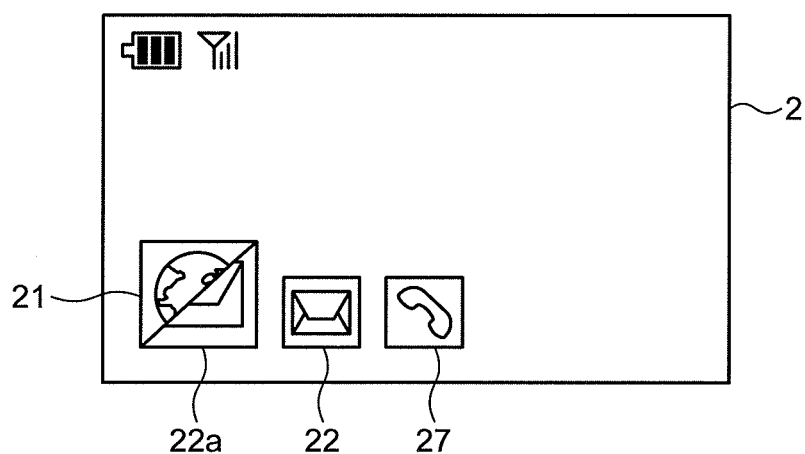
FIG. 14C is a diagram illustrating another example of control when a function is activated in a state where one function is activated.
Figure 15:
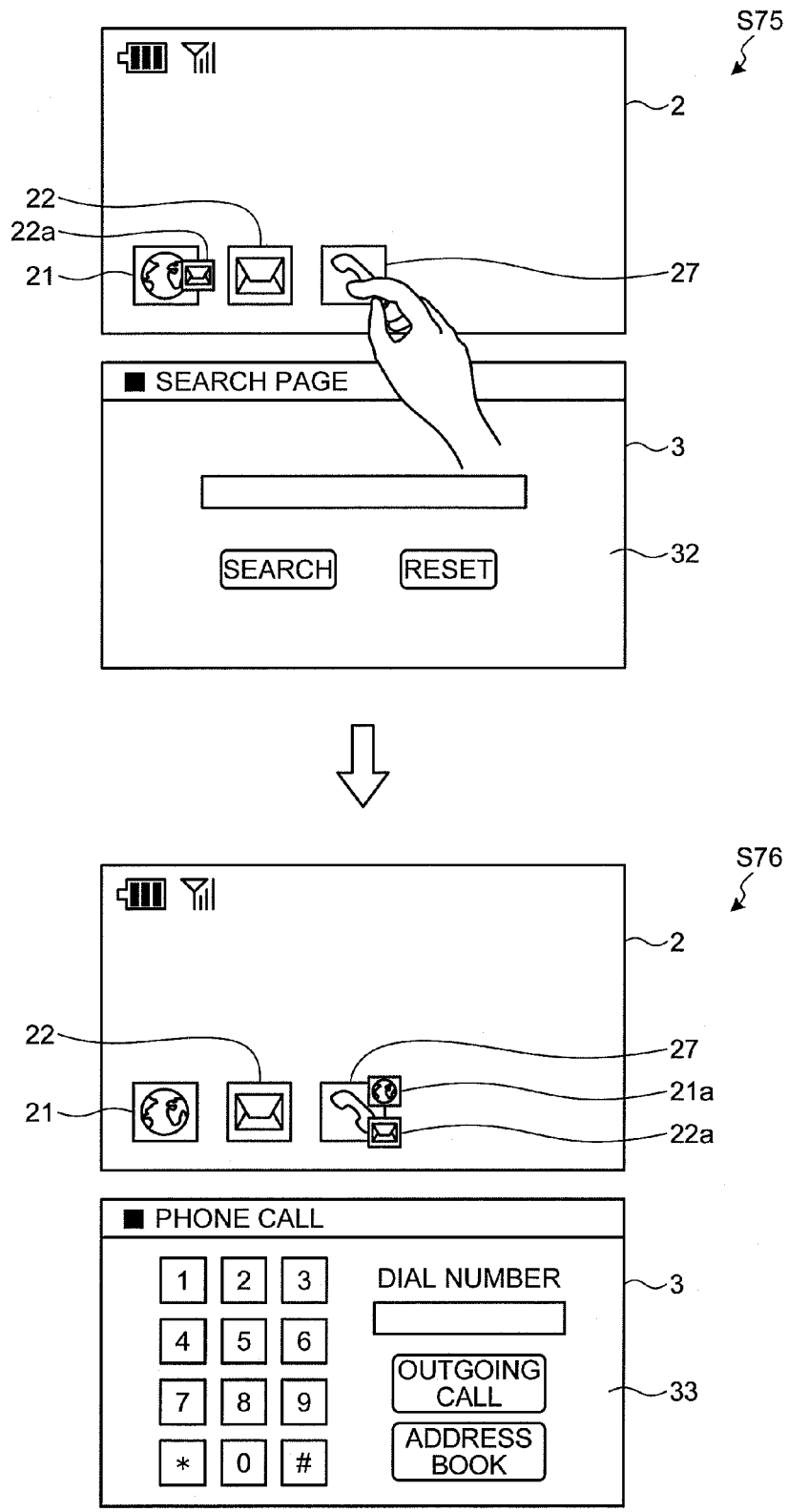
FIG. 15 is a diagram illustrating an example of control when a function is activated in a state where two functions are activated.
Figure 16:
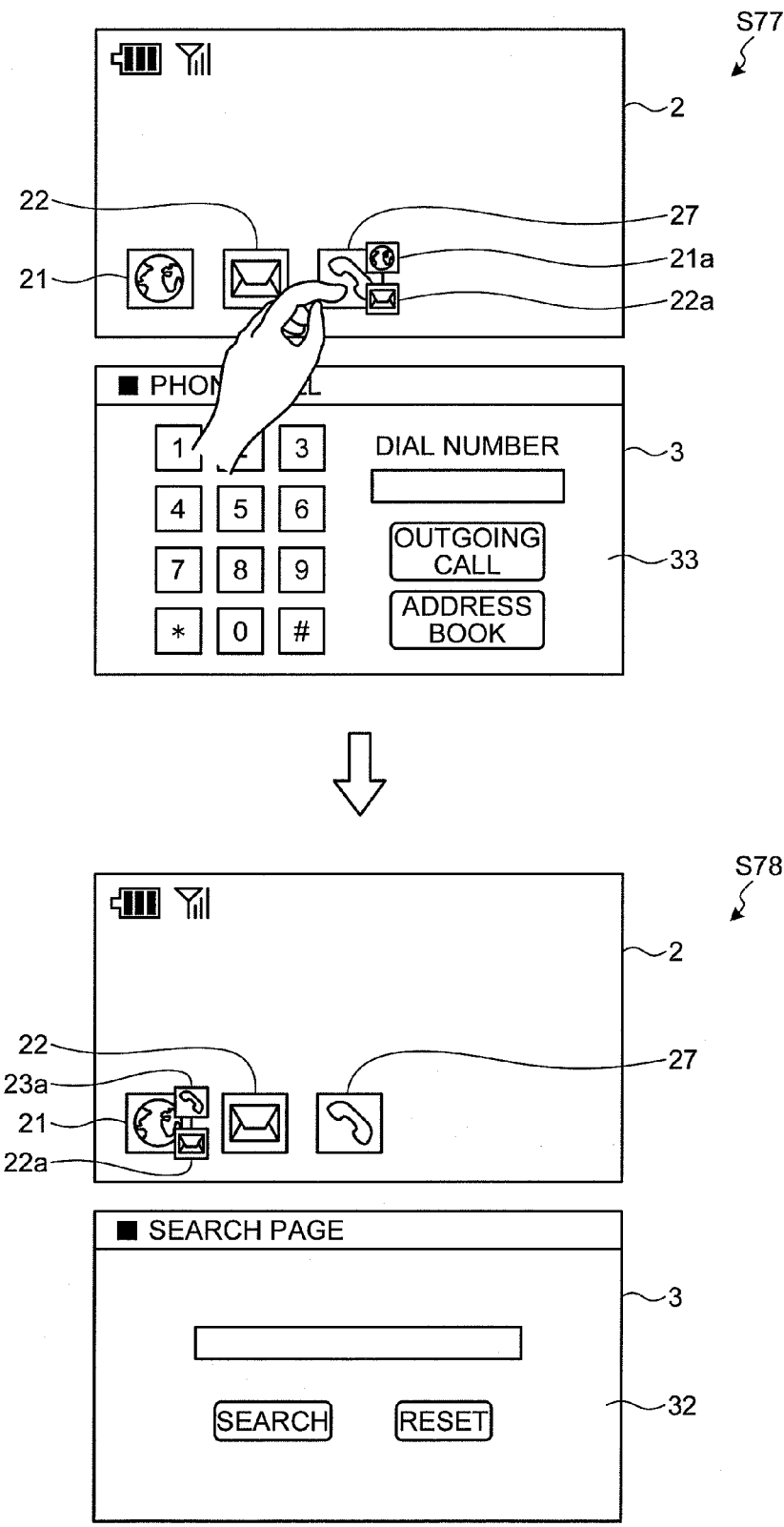
FIG. 16 is a diagram illustrating an example of control when a function in suspension is resumed.

Control upon the activation of a function in the mobile phone 101 will be described with reference to FIGS. 13 to 18. FIG. 13 is a diagram illustrating an example of control when a function is activated in a state where no other function is activated. FIG. 14A is a diagram illustrating an example of control when a function is activated in a state where one function is activated. FIGS. 14B and 14C are diagrams illustrating another example of control when a function is activated in a state where one function is activated. FIG. 15 is a diagram illustrating an example of control when a function is activated in a state where two functions are activated. FIG. 16 is a diagram illustrating an example of control when a function in suspension is resumed. FIG. 17 is a diagram illustrating another example of control when a function in suspension is resumed. FIG. 18 is a diagram illustrating an example of control when a function in execution is terminated.

In the following description, it is assumed that the mobile phone 101 is in the second form and the touch panel 3 is exposed to the outside. Further, it is assumed that the touch panel 2 is generally used as a display unit on which objects for activating the functions of the mobile phone 101 are displayed, and the touch panel 3 is generally used as a display unit on which a screen provided by an activated function is displayed.

At Step S71 illustrated in FIG. 13, an idle screen on which icons 21, 22, and 27 are arranged is displayed on the touch panel 2. An idle screen on which no icons are arranged is displayed on the touch panel 3. The icon 21 is an object used for activating a web browsing function. The icon 22 is an object used for activating an email function. The icon 27 is an object used for activating a phone call function. In the present embodiment, although the icon 21 or the like formed of a pictogram is displayed as an object for activating the function of the mobile phone 101, a menu item, a button, or the like may be displayed as an object for activating the function.

It is assumed that the user performs a tap operation on the icon 22. The tap operation may be any one of a single-tap operation, a double-tap operation, and a long-tap operation.

In this manner, when a tap operation is performed on an object in a state where a functional screen is not displayed, the mobile phone 101 activates a function corresponding to the tapped object and displays a screen corresponding to the function on the touch panel 3. In the example illustrated in FIG. 13, the mobile phone 101 activates an email function corresponding to the icon 22 and displays a mail composition screen 31 provided by the email function on the touch panel 3 at Step S72.

At Step S73 illustrated in FIG. 14A, an idle screen on which the icons 21, 22, and 27 are arranged is displayed on the touch panel 2, and the mail composition screen 31 is displayed on the touch panel 3 similarly to Step S72 of FIG. 13. That is, at Step S73, only the email function corresponding to the icon 22 is executed. It is assumed that the user performs a tap operation on the icon 21.

In this manner, when a tap operation is performed on an object during execution of a certain function, the mobile phone 101 suspends the function in execution and displays a symbol corresponding to the suspended function in a display region of the tapped object or near the display region. Further, the mobile phone 101 activates a function corresponding to the tapped object and displays a screen corresponding to the function on the touch panel 3.

The symbol described herein is displayed to indicate that there is another function suspended in order to activate a function in execution. For example, the symbol may be a simple figure such as a simple circle or a rectangle, or may be a character that indicates the name of the suspended function or a reduced version of the icon corresponding to the suspended function as in an example of FIG. 14A. The use of the character indicating the name of the suspended function or the icon in a reduced size corresponding to the suspended function as the symbol enables the user to easily identify the suspended function.

Displaying the symbol in the display region of the object or near the display region includes displaying the symbol so as to partially overlap the display region of the object. In the following description, displaying the symbol in the display region of the object or near the display region may be referred to as adding a symbol to an object.

In the example illustrated in FIG. 14A, the mobile phone 101 suspends the email function and adds a symbol 22a corresponding to the email function to the icon 21 at Step S74. Moreover, the mobile phone 101 activates a web browsing function corresponding to the icon 21 and displays a browser screen 32 provided by the web browsing function on the touch panel 3.

As in the example, by adding a symbol corresponding to a function in suspension to an icon corresponding to a function in execution, the user can understand which function is in suspension just by looking at the symbol added to the icon. Further, the user can understand which function is currently in execution just by looking at the icon. Such an effect is realized using the display region of an existing icon without deteriorating the utilization efficiency of the touch panel 2 or the like. In mobile electronic devices, in many cases, since the area of the display unit is relatively small, it is very important not to deteriorate the utilization efficiency of the display unit.

As illustrated in FIG. 14B, the icon 21 to which the symbol 22a corresponding to the function in suspension is added may be displayed at an enlarged scale. By controlling in this manner, the user can more easily understand which function is in suspension and more easily identify the added symbol. Alternatively, as illustrated in FIG. 14C, the icon 21 and the symbol 22a may be displayed in a unified manner.

At Step S75 illustrated in FIG. 15, an idle screen on which the icons 21, 22, and 27 are arranged is displayed on the touch panel 2, and the browser screen 32 is displayed on the touch panel 3 similarly to Step S74 in FIG. 14A. The symbol 22a corresponding to the email function is added to the icon 21. That is, at Step S75, the web browsing function is in execution, and the email function is in suspension. It is assumed that the user performs a tap operation on the icon 27.

In this manner, when a tap operation is performed on an object during execution of a certain function, the mobile phone 101 suspends the function in execution and adds a symbol corresponding to the suspended function to the tapped object. In this case, the mobile phone 101 also adds the symbol corresponding to the function that is already suspended to the tapped object. Further, the mobile phone 101 activates the function corresponding to the tapped object and displays a screen corresponding to the function on the touch panel 3.

In the example illustrated in FIG. 15, the mobile phone 101 suspends the web browsing function and adds the symbol 21a corresponding to the web browsing function and the symbol 22a corresponding to the email function to the icon 27 at Step S76. Moreover, the mobile phone 101 activates a phone call function corresponding to the icon 27 and displays a phone call screen 33 provided by the phone call function on the touch panel 3.

When a number of functions are in suspension, the symbols corresponding to the functions in suspension are arranged in ascending order of the time elapsed from the suspension. In this manner, since the symbols are arranged in ascending order of the time elapsed from the suspension, the user can understand the order in which the functions are suspended. Further, as will be described later, since the function of which the time elapsed from the suspension is the shortest is determined as a function to be resumed, the user can understand which function will be resumed when the user performs an operation of resuming a function in suspension.

When there are a number of functions in suspension, in order to prevent the display from being complicated, only a predetermined number of symbols may be added to an object such as an icon. In this case, in order to indicate that there are other symbols that are to be added but are not added, characters such as " . . . " may be added.

At Step S77 illustrated in FIG. 16, an idle screen on which the icons 21, 22, and 27 are arranged is displayed on the touch panel 2 and the phone call screen 33 is displayed on the touch panel 3 similarly to Step S76 of FIG. 15. The symbol 21a corresponding to the web browsing function and the symbol 22a corresponding to the email function are added to the icon 27. That is, at Step S77, the phone call function is in execution, and the web browsing function and the email function are in suspension. It is assumed that the user performs a tap operation on the icon 27.

In this manner, when a tap operation is performed on an object to which symbol(s) indicating that there is function(s) in suspension is added, the mobile phone 101 suspends a function in execution and resumes a function of which the time elapsed from the suspension is the shortest among the functions in suspension. In this case, the mobile phone 101 adds a symbol corresponding to the function in suspension to an object corresponding to the resumed function. The mobile phone 101 displays a screen corresponding to the resumed function on the touch panel 3.

In the example illustrated in FIG. 16, the mobile phone 101 suspends the phone call function, resumes the web browsing function of which the time elapsed from the suspension is the shortest, and displays the browser screen 32 provided by the web browsing function on the touch panel 3 at Step S78. Moreover, the mobile phone 101 adds a symbol 23a corresponding to the suspended phone call function and a symbol 22a corresponding to the email function in suspension to the icon 21.

At Step S79 illustrated in FIG. 17, an idle screen on which the icons 21, 22, and 27 are arranged is displayed on the touch panel 2 and a phone call screen 33 is displayed on the touch panel 3 similarly to Step S76 of FIG. 15. A symbol 21a corresponding to the web browsing function and a symbol 22a corresponding to the email function are added to the icon 27. That is, at Step S79, the phone call function is in execution, and the web browsing function and the email function are in suspension. It is assumed that the user performs a pinch operation on the icon 27. The pinch operation is an operation of moving a plurality of fingers while maintaining contact with a touch panel after touching the touch panel with the fingers so as to change the distance between the contacting positions of the respective fingers.

In this manner, when a pinch operation is performed on an object to which symbol(s) indicating that there is function(s) in suspension is added, the mobile phone 101 suspends the function in execution and resumes the function of which the time elapsed from the suspension is the shortest among the functions in suspension. In this case, the mobile phone 101 adds a symbol corresponding to the function in suspension to an object corresponding to the resumed function. The mobile phone 101 displays a screen corresponding to the resumed function on the touch panel 2 rather than the touch panel 3.

In the example illustrated in FIG. 17, at Step S80, the mobile phone 101 suspends a phone call function, resumes a web browsing function of which the time elapsed from the suspension is the shortest, and displays the browser screen 32 provided by the web browsing function on the touch panel 2. Moreover, the mobile phone 101 adds a symbol 23a corresponding to the suspended phone call function and a symbol 22a corresponding to the email function in suspension to the icon 21.

As is obvious from the examples illustrated in FIGS. 16 and 17, the mobile phone 101 is configured such that the user can designate the display unit by a simple operation, on which the screen provided by the resumed function is displayed. In FIGS. 16 and 17, although a function in suspension is resumed in response to an operation on an object to which a symbol is added, when a tap operation is performed on the icon corresponding to the function in suspension, a function corresponding to the icon may be resumed.

Although the description is made in which the function in suspension is resumed when a tap operation or a pinch operation is performed on an object to which a symbol indicating that there is a function in suspension is added, the function in suspension may be resumed in response to another operation such as a sweep operation or a flick operation. For example, the function in suspension may be resumed when the user performs an operation of rotating an object to which symbol(s) indicating that there is function(s) in suspension is added. In this case, the functions in suspension may be resumed one by one in ascending order of the time elapsed from the suspension according to the amount of rotation of the object.

Alternatively, the function in suspension may be resumed when the user performs an operation of dragging an object to which symbol(s) indicating that there is function(s) in suspension is added. In this case, when a finger is released at the point in time the object is dragged from the touch panel 2 to the touch panel 3, a screen provided by a resumed function may be displayed on the touch panel 2 in a state where a screen provided by the function in execution is displayed on the touch panel 3. When a finger is released at the point in time the object is dragged from the touch panel 3 to the touch panel 2, a screen provided by the function in execution may be displayed on the touch panel 2, and a screen provided by the resumed function may be displayed on the touch panel 3. The relation between the dragging direction and the display position of a screen may be reversed.

At Step S81 illustrated in FIG. 18, an idle screen on which the icons 21, 22, and 27 are arranged is displayed on the touch panel 2, and the phone call screen 33 is displayed on the touch panel 3 similarly to Step S76 of FIG. 15. A symbol 21a corresponding to the web browsing function and a symbol 22a corresponding to the email function are added to the icon 27. That is, at Step S81, the phone call function is in execution, and the web browsing function and the email function are in suspension. It is assumed that the user performs a predetermined operation of terminating the phone call function.

In this manner, when the predetermined operation of terminating a function in execution is performed, the mobile phone 101 terminates the function in execution and resumes a function of which the time elapsed from the suspension is the shortest among the functions in suspension. In this case, when there is another function in suspension, the mobile phone 101 adds a symbol corresponding to the function in suspension to an object corresponding to the resumed function. Further, the mobile phone 101 displays a screen corresponding to the resumed function on the touch panel 3.

In the example illustrated in FIG. 18, at Step S82, the mobile phone 101 terminates the phone call function, resumes the web browsing function of which the time elapsed from the suspension is the shortest, and displays the browser screen 32 provided by the web browsing function on the touch panel 3. Moreover, the mobile phone 101 adds a symbol 22a corresponding to the email function in suspension to the icon 21.

Then, a functional configuration of the mobile phone 101 will be described with reference to FIG. 19. FIG. 19 is a block diagram illustrating a functional configuration of the mobile phone 101. As illustrated in FIG. 19, the mobile phone 101 includes the touch panel 2, the touch panel 3, the form detecting unit 4, the power supply unit 5, the communication unit 6, a speaker 7, the microphone 8, the storage unit 9, the control unit 10, and the RAM 11.

The storage unit 9 stores the mail program 9A for implementing an email function, the browser program 9B for implementing a web browsing function, a phone call program 9E for implementing a phone call function, a control program 9F for implementing the above-described screen control, and execution state data 9G in which information on the execution state of functions is stored. In addition, the storage unit 9 stores other programs and data such as an operating system program that implements basic functions of the mobile phone 101 and address book data in which names, telephone numbers, mail addresses, and the like are registered.

The execution state data 9G will be described with reference to FIG. 20. FIG. 20 is a diagram illustrating an example of the execution state data 9G. As illustrated in FIG. 20, the execution state data 9G includes items such as Layer Number and Program Name, and data is stored for each activated function. The execution state data 9G is provided for each display unit, and the execution state data 9G illustrated in FIG. 20 is the execution state data 9G corresponding to the touch panel 3 at the point in time of Step S76 illustrated in FIG. 15.

A value indicating an execution order of functions is stored in the Layer Number item. Specifically, when a certain function is in execution, "0" is stored in the Layer Number item of data corresponding to the function. When a certain function is suspension, a value of "1" or more, which is allocated by incrementing by 1 in ascending order of the time elapsed from the suspension, is stored in the Layer Number item of data corresponding to the function. The name of a program for implementing a function is stored in the Program Name item.

As for the data on the first row of the execution state data 9G illustrated in FIG. 20, "0" is stored in the Layer Number item, and "phone call program" is stored in the Program Name item. This data indicates that a phone call function implemented by the phone call program 9E is in execution. As for the data on the second row of the execution state data 9G illustrated in FIG. 20, "1" is stored in the Layer Number item, and "browser program" is stored in the Program Name item. This data indicates that a web browsing function implemented by the browser program 9B is in suspension, and the time elapsed from the suspension is the shortest. As for the data on the third row of the execution state data 9G illustrated in FIG. 20, "2" is stored in the Layer Number item, and "mail program" is stored in the Program Name item. This data indicates that an email function implemented by the mail program 9A is in suspension, and the time elapsed from the suspension is the second shortest.

The execution state data 9G is updated by the control unit 10 when a function is activated, suspended, resumed, or terminated.

The control unit 10 integrally controls the operation of the mobile phone 101. For example, the control unit 10 executes the control program 9F to thereby implement a function of changing a display mode of an object such as an icon in response to execution and suspension of functions as described above.

Then, a procedure that the control unit 10 executes based on the control program 9F will be described with reference to FIG. 21. The procedure illustrated in FIG. 21 is executed when the touch panel 2 detects contact to an object such as an icon corresponding to an executable function while the mobile phone 101 is in the second form.

Figure 21:
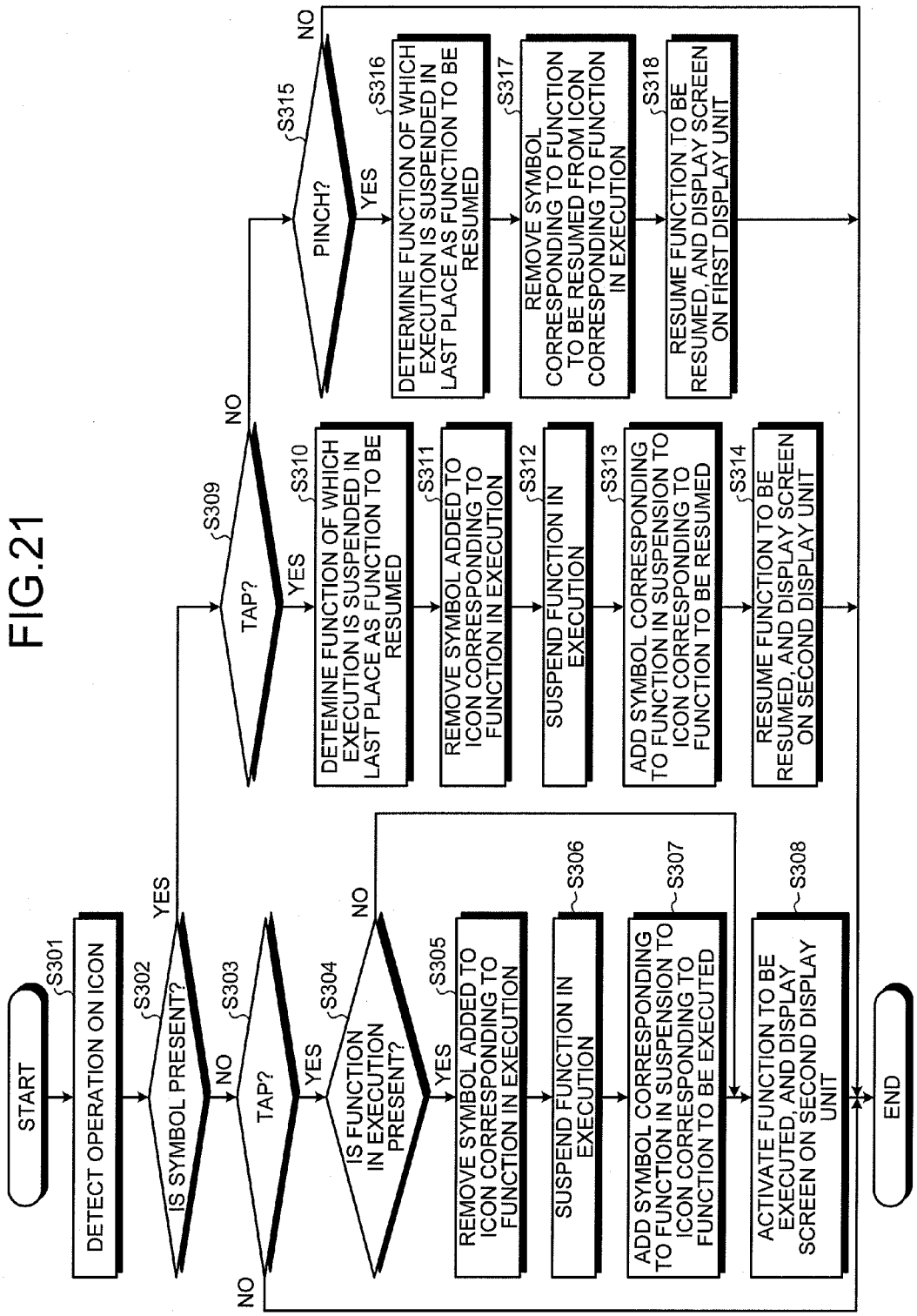
FIG. 21 is a flowchart illustrating the operation of a control unit when a contact to an icon corresponding to an executable function is detected.

FIG. 21 is a flowchart illustrating the operation of the control unit 10 when contact to an icon corresponding to an executable function is detected. As illustrated in FIG. 21, when the touch panel 2 detects contact to an icon at Step S301, then at Step S302, the control unit 10 determines whether symbol(s) is added to the icon on which contact is detected. Whether symbol(s) is added to the icon can be determined, for example, based on whether the data of a function corresponding to the icon is stored in the execution state data 9G with "0" set to the Layer Number item for, and whether the data of another function is stored in the execution state data 9G.

When no symbol is added to the icon on which contact is detected (No at Step S302), then at Step S303, the control unit 10 determines whether the contact is caused by a tap operation. When the contact is not caused by a tap operation (No at Step S303), the control unit 10 does not perform any particular process.

When the contact is caused by a tap operation (Yes at Step S303), then at Step S304, the control unit 10 determines whether there is a function in execution. Whether there is a function in execution can be determined, for example, based on where data is stored in the execution state data 9G. When there is no function in execution (No at Step S304), then at Step S308, the control unit 10 activates a function corresponding to the tapped icon and displays a screen provided by the function on the touch panel 3.

When there is a function in execution (Yes at Step S304), the control unit 10 removes symbol(s) added to the icon corresponding to the function in execution at Step S305, and suspends the function in execution at Step S306. Moreover, the control unit 10 adds symbol(s) corresponding to the function(s) in suspension to the tapped icon at Step S307. Thereafter, the control unit 10 activates a function corresponding to the tapped icon at Step S308 and displays a screen provided by the function on the touch panel 3. The order of executing Steps S305 to S308 may be different from the above.

On the other hand, when symbol(s) is added to the icon on which contact is detected (Yes at Step S302), then at Step S309, the control unit 10 determines whether the contact is caused by a tap operation. When the contact is caused by the tap operation (Yes at Step S309), then at Step S310, the control unit 10 determines a function of which the execution is suspended in the last place as a function to be resumed. The function suspended in the last place can be specified, for example, by retrieving data, in which "1" is set to the Layer Number item, from the execution state data 9G.

Subsequently, the control unit 10 removes the symbol(s) added to the icon corresponding to the function in execution at Step S311, and suspends the function in execution at Step S312. Moreover, at Step S313, the control unit 10 adds symbol(s) corresponding to the function(s) in suspension to the icon corresponding to the function to be resumed. In this case, the symbols are arranged in ascending order of the time elapsed from the suspension based on the value of the Layer Number item of the execution state data 9G or the like. Thereafter, the control unit 10 resumes the function to be resumed and displays a screen provided by the function on the touch panel 3 at Step S314. The order of executing Steps S311 to S314 may be different from the above.

When the contact is not caused by the tap operation (No at Step S309), the control unit 10 determines whether the contact is caused by a pinch operation at Step S315. When the contact is not caused by the pinch operation (No at Step S315), the control unit 10 does not perform any particular process.

When the contact is caused by the pinch operation (Yes at Step S315), then at Step S316, the control unit 10 determines the function of which the execution is suspended in the last place as a function to be resumed. Subsequently, the control unit 10 removes a symbol corresponding to the function to be resumed from the icon corresponding to the function in execution at Step S317. Moreover, the control unit 10 resumes the function to be resumed and displays a screen provided by the function on the touch panel 2 rather than the touch panel 3 at Step S318. The order of executing Steps S317 and S318 may be different from the above.

As described above, in the present embodiment, since a symbol corresponding to a function in suspension is added to an icon corresponding to a function in execution, the user can easily understand which function is in suspension.

In the second embodiment, although the screen provided by a function to be resumed is displayed on the touch panel 2 when a pinch operation is performed on an icon to which a symbol is added, such a behavior may be performed in response to another operation such as a double-tap operation.

In the second embodiment, although an example in which the present invention is applied to an electronic device having a touch panel has been described, the technique according to the present embodiment may be applied to an electronic device configured so as to operate objects such as icons by using a mouse, a touch pad, a trackball, and the like. In this case, the tap operation in the above description may be substituted with a click operation, and the pinch operation may be substituted with a double-click operation.

Figure 22:
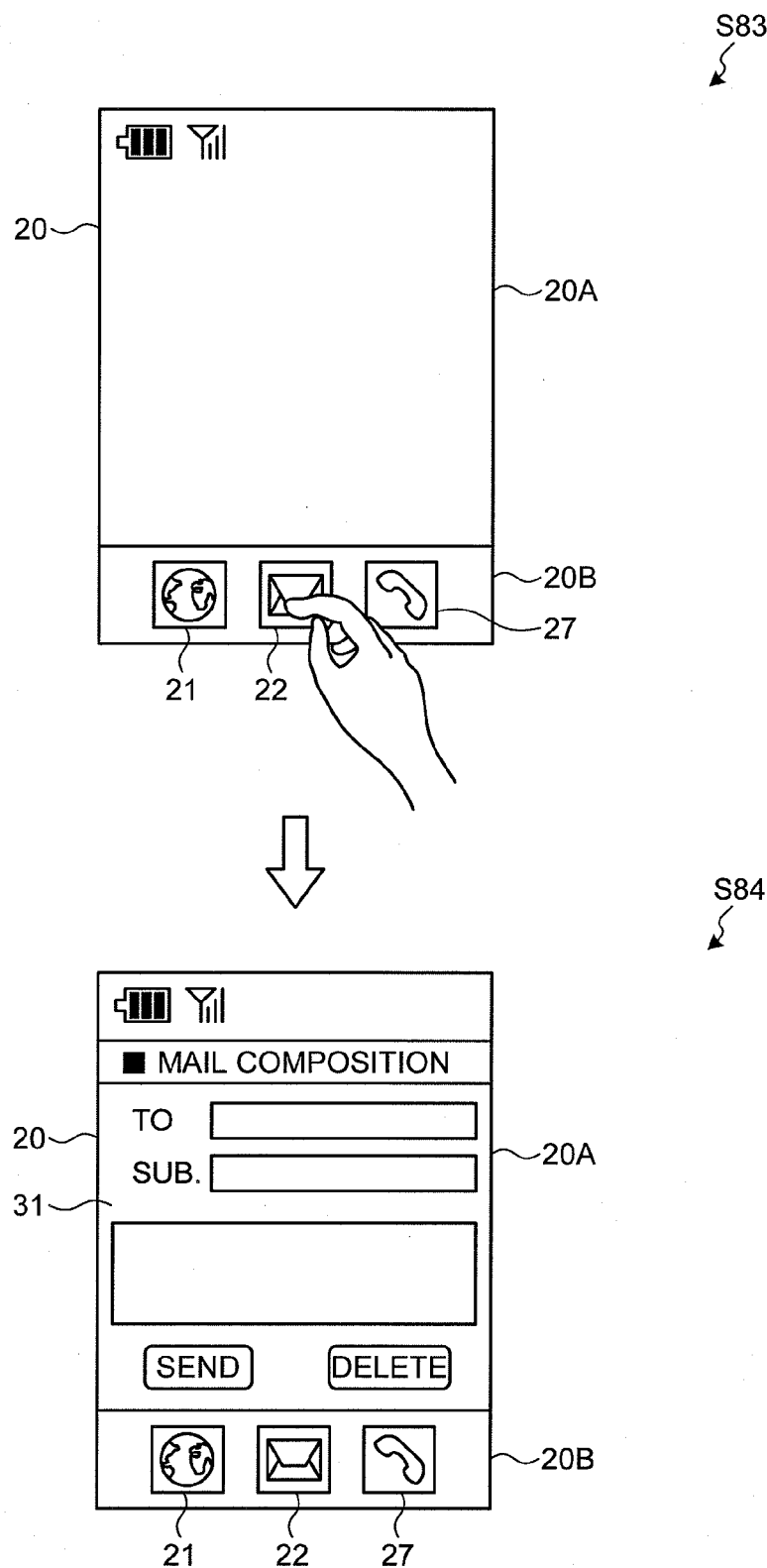
FIG. 22 is a diagram illustrating an example of control when a function is activated in a state where no other function is activated.
Figure 23:
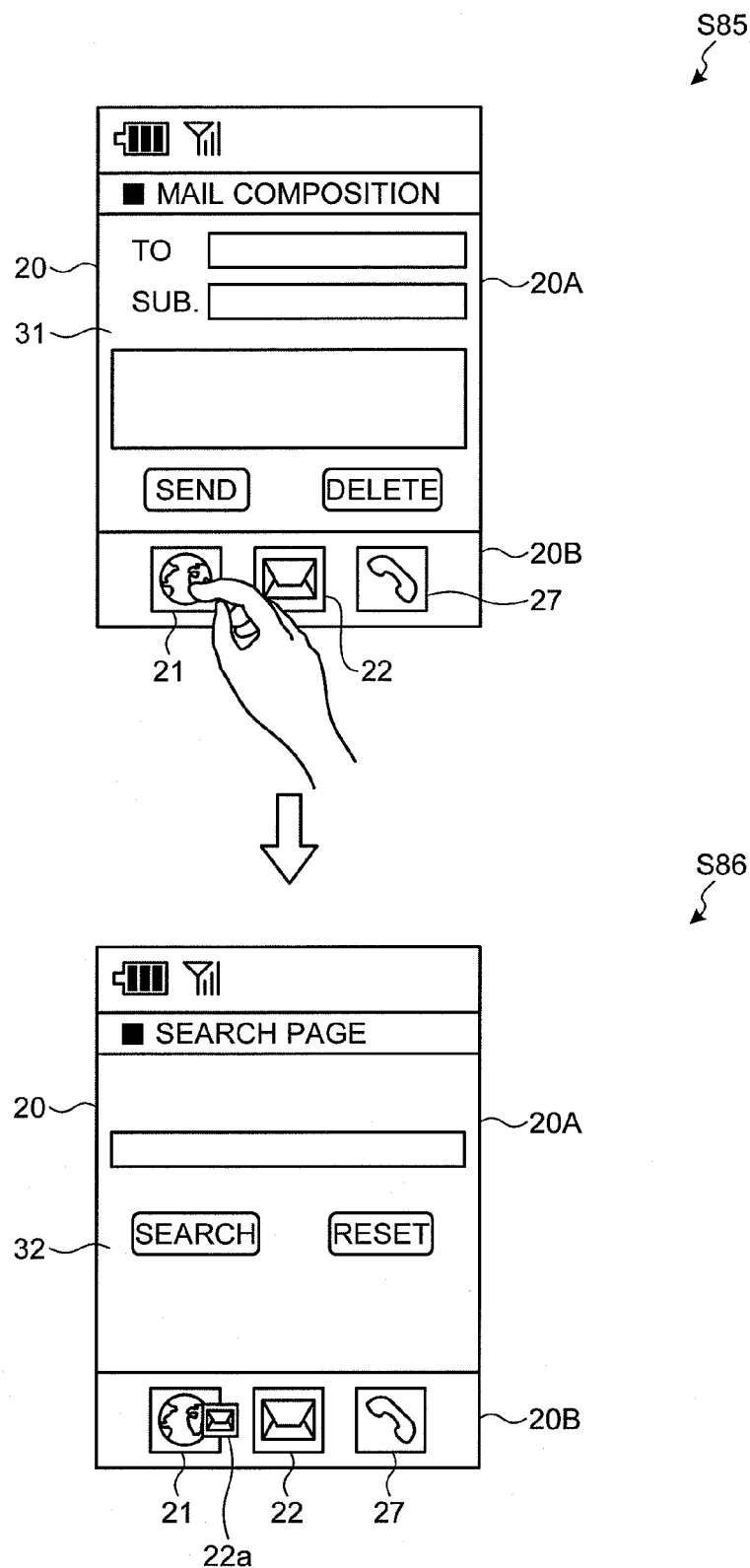
FIG. 23 is a diagram illustrating an example of control when a function is activated in a state where one function is activated.

In the second embodiment, although an example of an electronic device having a plurality of display units has been described, the present invention can also be applied to an electronic device having only one display unit. An example in which the present invention is applied to an electronic device having only one display unit will be described with reference to FIGS. 22 and 23. FIG. 22 is a diagram illustrating an example of control when a function is activated in a state where any other function is not activated. FIG. 23 is a diagram illustrating an example of control when a function is activated in a state where one function is activated.

At Step S83 illustrated in FIG. 22, a touch panel 20 is divided into two display regions 20A and 20B. The display region 20A is used for displaying a functional screen provided by various functions. The display region 20B is used for arranging objects such as icons for activating various functions. Icons 21, 22, and 27 are arranged on the display region 20B. Any functional screen is not displayed on the display region 20A.

It is assumed that the user performs a tap operation on the icon 22. In this manner, when a tap operation is performed on an object in a state where the functional screen is not displayed, a function corresponding to the tapped object is activated, and a screen corresponding to the function is displayed on the display region 20A. In the example illustrated in FIG. 22, at Step S84, an email function corresponding to the icon 22 is activated, and a mail composition screen 31 provided by the email function is displayed on the display region 20A.

At Step S85 illustrated in FIG. 23, the icons 21, 22, and 27 are arranged on the display region 20B, and the mail composition screen 31 is displayed on the display region 20A similarly to Step S84 of FIG. 22. That is, at Step S85, only the email function corresponding to the icon 22 is activated.

It is assumed that the user performs a tap operation on the icon 21. In this manner, when a tap operation is performed on an object during execution of a certain function, the function in execution is suspended, and a symbol corresponding to the suspended function is added to the tapped object. Also, a function corresponding to the tapped object is activated, and a screen corresponding to the function is displayed on the display region 20A.

In the example illustrated in FIG. 23, at Step S86, an email function is suspended, and a symbol 22a corresponding to the email function is added to the icon 21. Moreover, a web browsing function corresponding to the icon 21 is activated, and the browser screen 32 provided by the web browsing function is displayed on the display region 20A.

The aspects of the present invention represented in the respective embodiments described above can be changed in an optional manner within a range without departing from the spirit of the present invention. For example, the control programs 9C and 9F may be divided into a plurality of modules, or may be integrated with other programs. The control programs 9C and 9F may be stored in a portable non-transitory storage medium such as a CD, a DVD, a Blu-ray disc, and a memory card and may be read by the mobile phone 1 or 101.

In the respective embodiments described above, although the first housing 1A is relatively slid with respect to the second housing 1B whereby the mobile phones 1 and 101 changes its form from the first form to the second form, the change from the first form to the second form may be realized by another operation other than such a sliding operation. For example, the mobile phones 1 and 101 may be folding phones in which the first and second housings 1A and 1B are coupled by a biaxial rotary hinge. In this case, the form change is realized when the first and second housings 1A and 1B are relatively rotated with respect to each other about the two axes of the hinge as a rotary axis.

The respective embodiments may be appropriately combined with each other. For example, in the first embodiment, the information on the functions in suspension may be displayed in the same manner as the second embodiment.

The invention claimed is:

1. An electronic device, comprising:
   a display module configured to display (i) at least one object among a plurality of objects and (ii) a screen provided by a function in execution, each of the plurality of objects corresponding to one of a plurality of functions; and
   a control module configured to display, when an operation is performed to a first object which is among the plurality of objects and corresponds to a first function, a first screen provided by the first function on the display module,
   wherein
   the control module is configured to, when the operation is performed in a case that second functions among the plurality of functions are executing,
   suspend the second functions, and
   display symbols indicating that executions of the second functions are in suspension, wherein the symbols are displayed on the first object or unified with the first object, and
   the control module is configured to display the symbols by arranging the symbols in ascending order of the time elapsed from the suspension of the second functions.

2. The electronic device according to claim 1, wherein the control module is configured to display reduced versions of second objects, which are among the plurality of objects and correspond to the second functions, as the symbols indicating that the executions of the second functions are in suspension.

3. The electronic device according to claim 1, wherein when the operation to the first object corresponding to the first function is performed in a state where the symbols indicating that the executions of the second functions are in suspension are displayed on the first object or unified with the first object,
   the control module is configured to
   resume the execution of one of the second functions, and
   display a second screen on the display unit, the second screen provided by the second function the execution of which is resumed.

4. The electronic device according to claim 1, wherein the display module includes a first display module and a second display module, and
   the control module is configured to
   display at least one of the plurality of objects on the first display module, and
   display a screen provided by a function in execution on the second display module.

5. The electronic device according to claim 4, wherein when the operation to the first object corresponding to the first function is performed in a state where the symbols indicating that the executions of the second functions are in suspension are displayed on the first object or unified with the first object and where the first screen is displayed on the second display module,
   the control module is configured to
   resume the execution of one of the second functions, and
   display a second screen on the second display module instead of the first screen, the second screen provided by the second function the execution of which is resumed.

6. The electronic device according to claim 5, wherein the operation is a tap operation or a sweep operation.

7. The electronic device according to claim 5, wherein the operation is a dragging operation for dragging the first object corresponding to the first function from the first display module to the second display module or from the second display module to the first display module.

8. The electronic device according to claim 4, wherein when the operation to the first object corresponding to the first function is performed in a state where the symbols indicating that the executions of the second functions are in suspension are displayed on the first object or unified with the first object and where the first screen is displayed on the second display module,
   the control module is configured to
   resume the execution of one of the second functions, and
   display a second screen on the first display module, the second screen provided by the second function the execution of which is resumed.

9. The electronic device according to claim 8, wherein the operation is a double-tap operation or a pinch operation.

10. The electronic device according to claim 1, wherein the control module is configured to display an object, over which a symbol indicating that an execution is in suspension is superimposed or which is unified with the symbol, at an enlarged scale.

11. A screen control method performed by an electronic device that includes a display module configured to display (i) at least one object among a plurality of objects and (ii) a screen provided by a function in execution, each of the plurality of objects corresponding to one of a plurality of functions, the method comprising:

displaying, when an operation is performed to a first object which is among the plurality of objects and corresponds to a first function, a first screen provided by the first function on the display module; and when the operation is performed in a case that second functions among the plurality of functions are executing, suspending the second functions, and displaying symbols indicating that executions of the second functions are in suspension, wherein the symbols are displayed on the first object or unified with the first object, and the symbols are displayed while being arranged in ascending order of the time elapsed from the suspension of the second functions.

12. A non-transitory storage medium that stores a control program for causing an electronic device to execute a screen control process, the electronic device including a display module configured to display (i) at least one object among a plurality of objects and (ii) a screen provided by a function in execution, each of the plurality of objects corresponding to one of a plurality of functions, the screen control process comprising:

displaying, when an operation is performed to a first object which is among the plurality of objects and corresponds to a first function, a first screen provided by the first function on the display module; and when the operation is performed in a case that second functions among the plurality of functions are executing, suspending the second functions, and displaying symbols indicating that executions of the second functions are in suspension, wherein the symbols are displayed on the first object or unified with the first object, and the symbols are displayed while being arranged in ascending order of the time elapsed from the suspension of the second functions.

\* \* \* \* \*